United States Patent
Evans et al.

(10) Patent No.: US 7,275,390 B2
(45) Date of Patent: Oct. 2, 2007

(54) DESICCANT CARTRIDGE FOR AN INTEGRATED CONDENSER/RECEIVER AND METHOD OF MAKING SAME

(75) Inventors: John M. Evans, Piqua, OH (US); David V. Flaugher, Beavercreek, OH (US); Douglas E. LeConey, Clayton, OH (US); Glenn D. Perrine, Eaton, OH (US)

(73) Assignee: Flow Dry Technology, Inc., Washington, DC (US)

( * ) Notice: Subject to any disclaimer, the term of this patent is extended or adjusted under 35 U.S.C. 154(b) by 477 days.

(21) Appl. No.: 10/511,356

(22) PCT Filed: Apr. 15, 2003

(86) PCT No.: PCT/US03/11736

§ 371 (c)(1), (2), (4) Date: Oct. 12, 2004

(87) PCT Pub. No.: WO03/089852

PCT Pub. Date: Oct. 30, 2003

(65) Prior Publication Data

US 2005/0229628 A1    Oct. 20, 2005

Related U.S. Application Data

(60) Provisional application No. 60/373,185, filed on Apr. 17, 2002, provisional application No. 60/373,386, filed on Apr. 17, 2002, provisional application No. 60/374,689, filed on Apr. 23, 2002.

(51) Int. Cl.
*F25B 43/00* (2006.01)
(52) U.S. Cl. .......................... 62/474; 62/509
(58) Field of Classification Search ................ 62/93, 62/221, 474, 509
See application file for complete search history.

(56) References Cited

U.S. PATENT DOCUMENTS

| | | | |
|---|---|---|---|
| 2,557,557 A | 6/1951 | Newcum |
| 5,149,453 A | 9/1992 | Parekh |
| 5,215,660 A | 6/1993 | Mosher |
| 5,440,910 A | 8/1995 | Florian |
| 5,537,839 A | 7/1996 | Burk |
| 5,666,791 A | 9/1997 | Burk |

(Continued)

FOREIGN PATENT DOCUMENTS

| | | |
|---|---|---|
| EP | 0 689 014 B1 | 6/1995 |
| EP | 0 921 022 A | 6/1999 |
| EP | 0 179 186 A | 2/2001 |
| JP | 11-257804 | 9/1999 |

*Primary Examiner*—Melvin Jones
(74) *Attorney, Agent, or Firm*—Wegman, Hessler & Vanderburg

(57) ABSTRACT

In accordance with one preferred embodiment, a desiccant cartridge (30) for insertion into an integrated condenser/receiver (10) comprises a rigid stand-off member (72) and a porous desiccant bag (34). The preferred rigid stand-off member comprises spaced inner and outer pad portions and an elongated stand-off portion terminating in the inner pad portion. The inner pad may include a tab portion. The porous desiccant bag is positioned between the inner and outer pad portions and affixed to one or both of the inner and outer pad portions. A rigid cap with a plurality of holes may be provided to which a second end of the porous desiccant bag may be attached. The porous desiccant bag includes first and second flat end seals, one of which is secured to attachment tab portions.

54 Claims, 18 Drawing Sheets

U.S. PATENT DOCUMENTS

| | | |
|---|---|---|
| 5,718,743 A | 2/1998 | Donnelly |
| 5,813,249 A | 9/1998 | Matsuo |
| 6,106,596 A * | 8/2000 | Haramoto et al. ............ 96/135 |
| 6,170,287 B1 | 1/2001 | Leitch |
| 6,185,959 B1 * | 2/2001 | Zajac ......................... 62/527 |
| 6,360,560 B1 | 3/2002 | Whitlow |
| 6,474,098 B2 | 11/2002 | Perrine |
| 2001/0025511 A1 | 10/2001 | Bernini |

* cited by examiner

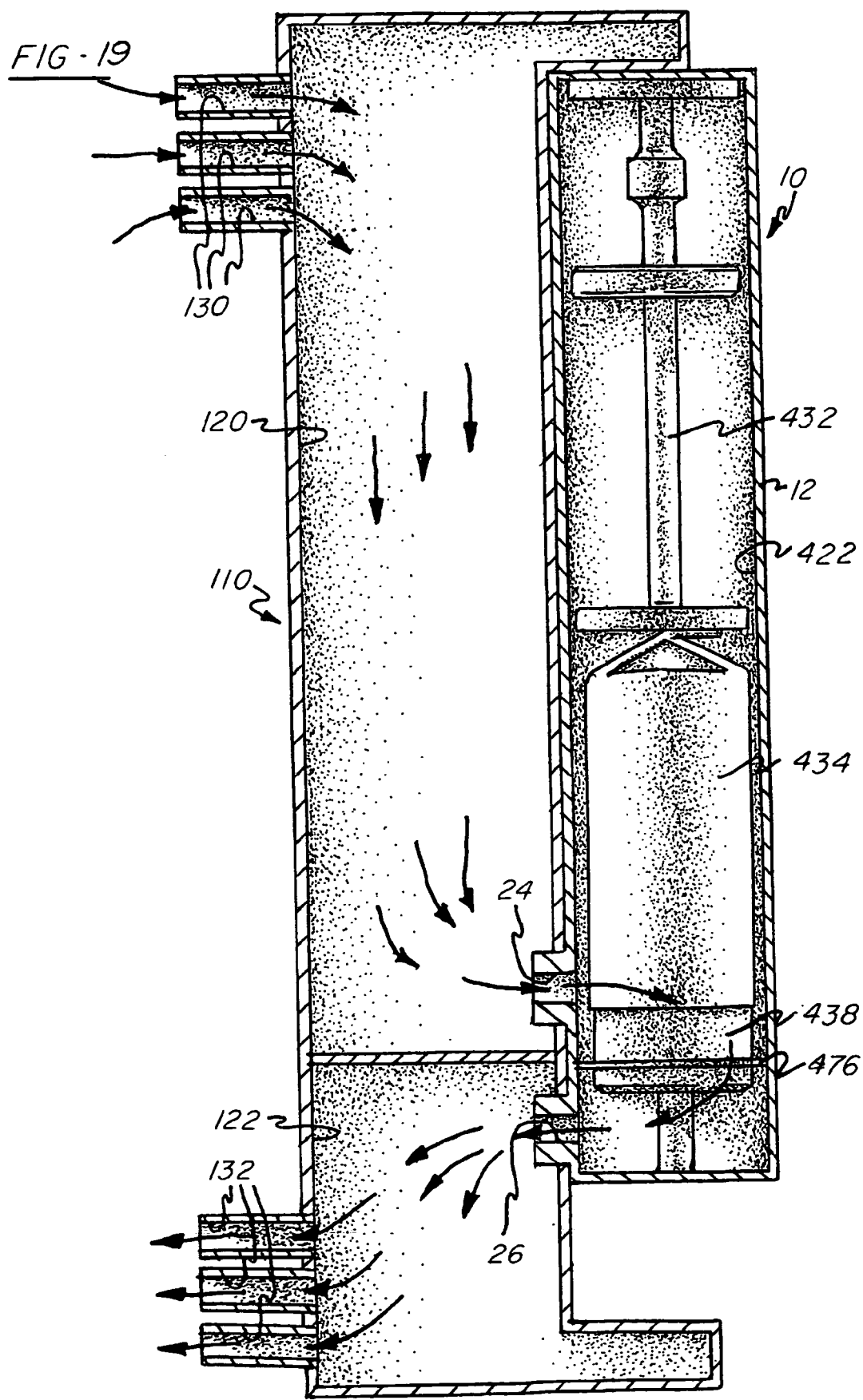

DESICCANT CARTRIDGE FOR AN INTEGRATED CONDENSER/RECEIVER AND METHOD OF MAKING SAME

CROSS-REFERENCE TO RELATED APPLICATIONS

This application claims the priority filing benefit of (1) International PCT application PCT/US03/11736 filed Apr. 15, 2003, and published under PCT 21(2) in the English language; (2) U.S. Provisional Application Ser. No. 60/373,185 filed Apr. 17, 2002; (3) U.S. Provisional Application Ser. No. 60/373,386 filed Apr. 17, 2002; and (4) U.S. Provisional Application Ser. No. 60/374,689 filed Apr. 23, 2002.

BACKGROUND OF THE INVENTION

1. Field of the Invention

The invention relates to a desiccant-containing package for use in an integrated condenser/receiver, and more particularly, to a desiccant-containing package comprising a porous desiccant bag (most preferably, a desiccant-containing packet or bag) secured to a rigid member.

2. Description of the Prior Art

Desiccant-containing packages have been employed in small diameter receivers that are juxtaposed along one of the condenser headers in an integrated condenser/receiver for an automotive air-conditioning system or the like. These integrated condenser/receiver structures eliminate the need for separate tubing to connect the condenser with the receiver and have become popular due to their reduced spatial requirements as compared with earlier designs. For instance, the overall dimensions of one integrated condenser/receiver proposed in U.S. Pat. No. 5,813,249 [hereinafter the "'249 patent"] are from about 300 mm-400 mm in height and about 300 mm-600 mm in width.

In the integrated condenser/receiver design proposed in the '249 patent, the axes of the receiver canister and the associated header lie parallel to that of the canister attached to, and contiguous with, the header. The desiccant-containing package positioned in the receiver dries refrigerant fluid (and the oil and moisture entrained therein) before the dried refrigerant enters a supercooler unit formed integrally with the condenser. Ultimately, the desiccant material is spent, that is, saturated with contaminants, and must be replaced.

U.S. Provisional Patent Application 60/178,595, the disclosure of which is incorporated herein by reference, discloses a desiccant containing package comprising a pouch preferably formed from a tube of porous polyester felt material. During manufacture, one end of the tube is sealed, preferably by tucking a portion of the tube side wall and flattening the end portion under conditions which cause the polyester fibers to fuse together and seal the end of the pouch. Desiccant material then is poured into the pouch. Most preferably, the open end of the pouch then is ultrasonically welded to an attachment ring of filter cap.

It can be difficult to insert, position and remove such desiccant bags from the receivers of known integrated condenser/receivers due to the compactness of the receivers. In particular, many known receiver designs require the removal and disposal of significant extraneous material with spent desiccant bags, thereby increasing the expense associated with the replacement of the spent bags.

U.S. Pat. No. 5,666,791 proposes an insert for a vehicle air conditioner. The insert is composed of two parts. One part contains a filter screen. The other part is an extension part bridging the distance from the filter screen to a detachable cover of the receiver.

According to the patent, the part which contains the filter screen and which requires higher manufacturing expenditures may be standardized for several sizes of condensers so that it can be produced in the same shape in large piece numbers. Depending on the size of the receiver, the part containing the filter screen is supplemented by an extension part which has a relatively simple shape and can therefore be produced at a reasonable price in different lengths by means of a modular-construction tool. In addition, it is taught that the construction reduces the amount of waste to be disposed of when the desiccant is spent because it will be sufficient to exchange and dispose of the part with the filter screen.

Nevertheless, the insert as a whole is likely to be relatively complex and expensive to produce. In one embodiment taught in U.S. Pat. No. 5,666,791, the container is provided on the inside with a supporting screen. The container, which is made of plastic, is molded around this supporting screen. The supporting screen may consist of plastic or of a special steel, the former having the advantage of being recyclable. In addition, it appears that a filter screen comprising a filter nonwoven material or a needle felt is assembled into the container. This mode of manufacture involves multiple component parts and several manufacturing steps, the combination of which likely increases the cost of manufacture.

U.S. Pat. No. 6,170,287 proposes that a tube of desiccant material be installed and located within a receiver canister by a stand-off comprised of a tight-fitting, notched, disk-shaped base and a narrow central post which is comparable in length to the height of the inlet above the lower end cap. The tight fit allows the tube to be inserted up into the canister, well away from the bottom of the canister and free of heat damage as an end cap of the canister is attached. Later, in operation, the central post keeps the tube located clear of inlet and outlet ports of the canister.

U.S. Pat. No. 6,360,560 proposes a condenser with an integral receiver dryer. The receiver dryer includes a dryer capsule for removing moisture from the refrigerant fluid. One drawback to the dryer capsule proposed in the reference is its relative complexity and likely expense of manufacture.

The dryer capsule proposed in U.S. Pat. No. 6,360,560 is generally cylindrical in shape and includes a base, a housing extending axially from the base and a cap closing an end of the housing. The base is disposed adjacent a seat wall to create a seal and prevent fluid from passing therebetween. The housing has a plurality of apertures extending therethrough and a filter covering the apertures. The dryer capsule includes a quantity of dryer material such as desiccant disposed within the housing. The cap has a loop with an aperture extending therethrough to allow a tool to engage the loop to remove the dryer capsule from the receiver dryer. The loop also acts as a spring to hold the base of the dryer capsule against the seat wall when an end closure is in place over an open end of the receiver dryer.

The end closure proposed in U.S. Pat. No. 6,360,560 has a head extending radially and a threaded shaft extending axially. The end closure also includes a seal disposed about the threaded shaft and adjacent the head. The threaded shaft engages the threaded open end such that the seal engages the side and the head overlaps the side bounding the open end.

It is known to place a fluorescent tracer dye wafer or the like in the desiccant package so that leaks in the refrigeration system can be readily detected by use of an ultraviolet light source. See for instance U.S. Pat. Nos. 5,149,453 and 5,440,910.

There remains a need in the art for improvements to desiccant cartridges for integrated condenser/receivers which simplify the manufacture, installation and removal of the cartridges and which minimize the extraneous material which must be disposed of with spent desiccant bags.

SUMMARY OF THE INVENTION

This need and others are addressed by means of an improvement to an integrated condenser/receiver comprising a desiccant cartridge for insertion into the receiver of the integrated condenser/receiver. A preferred desiccant cartridge comprises a porous desiccant bag and a rigid member. A preferred porous desiccant bag defines sealed first and second end portions, at least one of which has a flat seal. The flat seal of the porous desiccant bag is secured to the tab portion of the rigid member.

A preferred desiccant cartridge comprises a rigid, preferably plastic, stand-off member and a porous desiccant bag or packet. The preferred rigid stand-off member comprises an inner pad portion, an elongated stand-off portion terminating in the inner pad portion and an outer pad portion spaced from the inner pad portion. The porous desiccant bag is positioned between the inner and outer pads and affixed to one or both of the inner and outer pad portions.

In accordance with a preferred embodiment, the rigid member is a rigid dongle including a skirt portion. A web portion closes an end of the skirt portion to form a cavity. One or more holes extending through the skirt portion from the cavity to an exterior surface of the skirt portion facilitate removal of the desiccant cartridge from the reservoir.

In accordance with one especially preferred embodiment, the rigid stand-off member further comprises a spacer bar portion and a clamp portion supported by the spacer bar portion for securing the porous desiccant bag. The preferred clamp portion includes a first clamping jaw supported by the spacer bar portion and a second clamping jaw supported by the first clamping jaw through a living hinge. The first and second clamping jaws each define complementary detents for engagement to secure the porous desiccant bag in the clamp portion. Most preferably, the first and second clamping jaws each define an outer annular channel for receiving an annular seal. This allows the clamp portion to act as a baffle preventing flow through the integrated condenser/receiver from bypassing desiccant material in the porous desiccant bag.

In accordance with another especially preferred embodiment, the rigid stand-off member further comprises a cage portion extending between the first and second pad portions. The preferred cage portion includes a first cage element coupled to the inner and outer pad portions. The preferred cage portion further includes a second cage element supported by the first cage element through a living hinge. The first and second cage elements define complementary detents for engagement to secure the porous desiccant bag in the cage portion. Most preferably, the first and second cage elements each comprise a plurality of annularly-arrayed spacer bars extending between the inner and outer pad portions as well as a plurality of hoops extending transversely of the plurality of annularly-arrayed spacer bars.

One advantage of the preferred desiccant cartridge is relative ease and inexpense of manufacture. In accordance with one aspect of the invention, the rigid stand-off member is cast as a unitary member from a suitable plastic or polymeric material. The porous desiccant bag, which preferably comprises a porous desiccant packet or bag, is affixed to one or both of the inner and outer pad portions. Preferred means for affixing the porous desiccant bag to the inner and outer pad portions include ultrasonic welding, although other means (such as thermal or vibration welding) will be apparent to those of ordinary skill in the art. In certain preferred embodiments in which the rigid stand-off member includes a clamp portion or a cage portion, the clamp or cage portion is closed so as to engage the complementary detents to secure the porous desiccant bag.

The structure of the rigid member serves to reduce the likelihood that the porous desiccant bag will be damaged as the rigid member is welded to the porous desiccant bag. Most preferably, the flat end seat which is to be welded to the tab portion of the rigid member is extended away from the bulk of the porous desiccant bag to protect the bulk of the porous desiccant bag from the energy used to form the weld.

Another advantage of the preferred desiccant cartridge is that it facilitates installation and removal of the porous desiccant bag. Inner and outer pad portions, for example, guide the porous desiccant bag into and out of the receiver during installation and removal. The combination of the inner and outer pad portions with the clamp or cage portions, in various exemplary embodiments, serve to immobilize the porous desiccant bag relative to the rigid stand-off member so as to promote smooth installation and removal.

During installation, the preferred desiccant cartridge is pressed through an open end of the reservoir so as to abut the spacer portion of the rigid cap against an end panel of the receiver. A demountable end closure or plug is engaged with an open end of the reservoir to provide fluid-tight closure of the receiver. Once installed, an elongated, relatively thin stand-off portion of either the rigid member or the end closure serves to position the desiccant cartridge in the reservoir. The desiccant cartridge is extracted from the reservoir by removing the demountable cap and then engaging a hook with a hole or eye defined in the rigid member so as to pull the desiccant cartridge from the reservoir.

Yet another advantage of the preferred desiccant cartridge is that it minimizes the extraneous material which must be discarded with a spent desiccant bag. The preferred desiccant cartridge, that is, the rigid stand-off member and the porous desiccant bag, can be removed from the receiver as a unit. Even assuming that the rigid stand-off member then is disposed of with the porous desiccant bag, the simplicity of the preferred rigid stand-off minimizes the amount of extraneous material which is discarded.

In accordance with yet another alternative embodiment of the invention, the preferred desiccant cartridge comprises a rigid, preferably plastic, stand-off member and a porous desiccant bag or pouch. The preferred rigid stand-off member comprises an inner pad portion, an elongated stand-off portion terminating in the inner pad portion and an attachment tab extending transversely to from the inner pad portion. The porous desiccant bag includes first and second flat end seals, one of which is secured to the attachment tab.

This alternative embodiment likewise is susceptible of relatively simple and inexpensive manufacture. Most preferably, the porous desiccant bag is manufactured by forming the first flat end seal in a first open end of a porous tube, as by ultrasonic welding; pouring desiccant into the porous tube; and forming the second flat end seal in a second open end of the porous tube. The rigid stand-off member is molded as a single piece. Then, the first or second flat end seal is secured to the attachment tab of the rigid stand-off member, as by ultrasonic welding. During this welding process, the first or second flat end seal is extended away from the bulk of the porous desiccant bag, so as to minimize damage to the porous desiccant bag during welding.

Still other embodiments of the desiccant cartridge comprise a porous cap in addition to the rigid stand-off member and porous desiccant bag. The preferred rigid cap defines a cavity which receives the second end portion of the porous desiccant bag.

The rigid cap also defines a plurality of perforations or holes which communicate between the cavity and an exterior of the rigid cap. This plurality of holes permits fluid to flow from the porous desiccant bag through the rigid cap. It is desirable that these holes be so dimensioned as to permit the flow of refrigerant fluid while retaining the desiccant material and inhibiting the flow of moisture, oil and other contaminants. In this manner, the perforations provide additional filtering of the refrigerant fluid which percolates through the desiccant material in the porous desiccant bag.

In accordance with an especially preferred embodiment, the rigid cap also defines a spacer portion extending away from the cavity defined in the rigid cap. The spacer is designed to abut against an end panel of the receiver to help position the desiccant cartridge in the reservoir.

One advantage of the preferred desiccant cartridge is relative ease and inexpense of manufacture. In accordance with one aspect of the invention, the rigid stand-off member and the rigid cap are each molded as one-piece castings from suitable plastic or polymeric materials. The preferred rigid stand-off member includes a tab portion which extends transversely from the inner pad portion in a direction opposite that of the elongated stand-off portion. The first end portion of the porous desiccant bag takes the form of a flat end seal which is secured to the tab portion of the rigid stand-off member. Preferred means for affixing the flat end seal of the porous desiccant bag to the tab portion of the rigid stand-off member include ultrasonic welding, although other means such as thermal or vibration welding will be apparent to those of ordinary skill in the art.

The preferred rigid cap includes a sleeve portion and a web portion which closes an end of the sleeve portion to define the cavity. The preferred spacer portion takes the form of a cylindrical spacer bar which extends from a central portion of the web portion. The plurality of holes extend through the web portion surrounding the central portion from which the spacer portion extends. Most preferably, the second end portion of the porous desiccant bag is secured to the sleeve portion of the rigid cap. Preferred means for affixing the second end portion of the porous desiccant bag to the sleeve portion of the rigid cap include ultrasonic welding, although other means such as thermal or vibration welding will be apparent to those of ordinary skill in the art.

Another advantage of the preferred desiccant cartridge is that it facilitates installation and removal of the porous desiccant bag. During installation, the preferred desiccant cartridge is pressed through an open end of the reservoir so as to abut the spacer portion of the rigid cap against an end panel of the receiver. A demountable cap is engaged with the open end of the reservoir to provide fluid-tight closure of the receiver. Once installed, the spacer portion of the rigid cap and the elongated stand-off portion of the rigid stand-off member serve to position the desiccant cartridge in the reservoir. The desiccant cartridge is extracted from the reservoir by removing the demountable cap and then pulling on the elongated stand-off portion of the rigid stand-off member to pull the desiccant cartridge from the reservoir.

Yet another advantage of the preferred desiccant cartridge is that it minimizes the extraneous material which must be discarded with a spent desiccant bag. The preferred desiccant cartridge, that is, the rigid stand-off member, the porous desiccant bag and the rigid cap, can be removed from the receiver as a unit. Even assuming that the rigid stand-off member then is disposed of with the porous desiccant bag, the simplicity of the preferred rigid stand-off member and of the rigid cap minimizes the amount of extraneous material which is discarded.

Therefore, one object of the invention is to simplify the manufacture, installation and removal of the cartridges. Another object of the invention is to minimize the extraneous material which must be disposed of with spent desiccant bags. The invention will be further described in conjunction with the appended drawings and following detailed description.

BRIEF DESCRIPTION OF THE DRAWINGS

FIG. 19 is a schematic sectional view of a portion of an integral condenser/receiver with the preferred desiccant cartridge positioned in the receiver of the integrated condenser/receiver.

DETAILED DESCRIPTION OF THE PREFERRED EMBODIMENT

Figure 1:
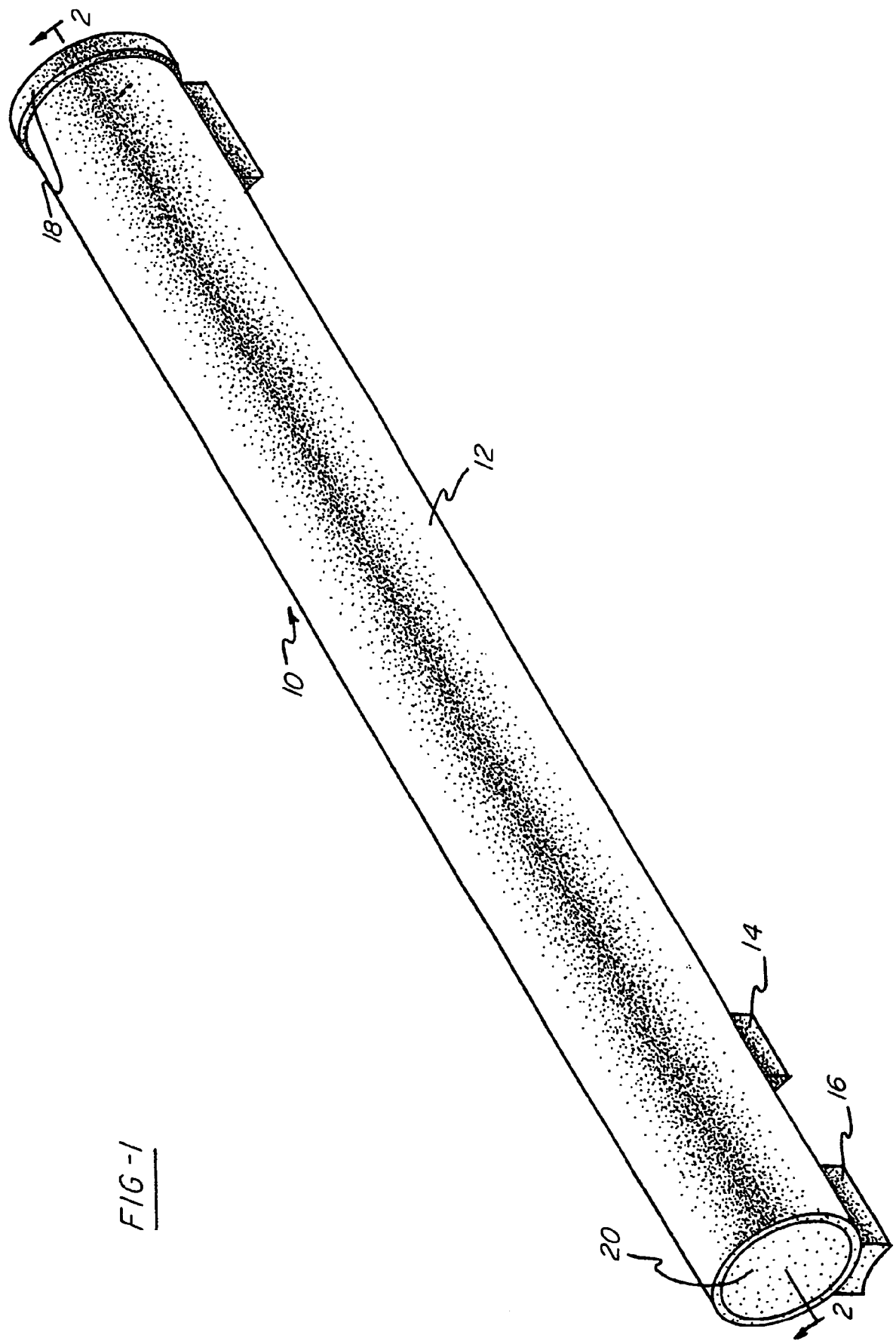
FIG. 1 is a perspective view of an integrated condenser/receiver.
Figure 2:
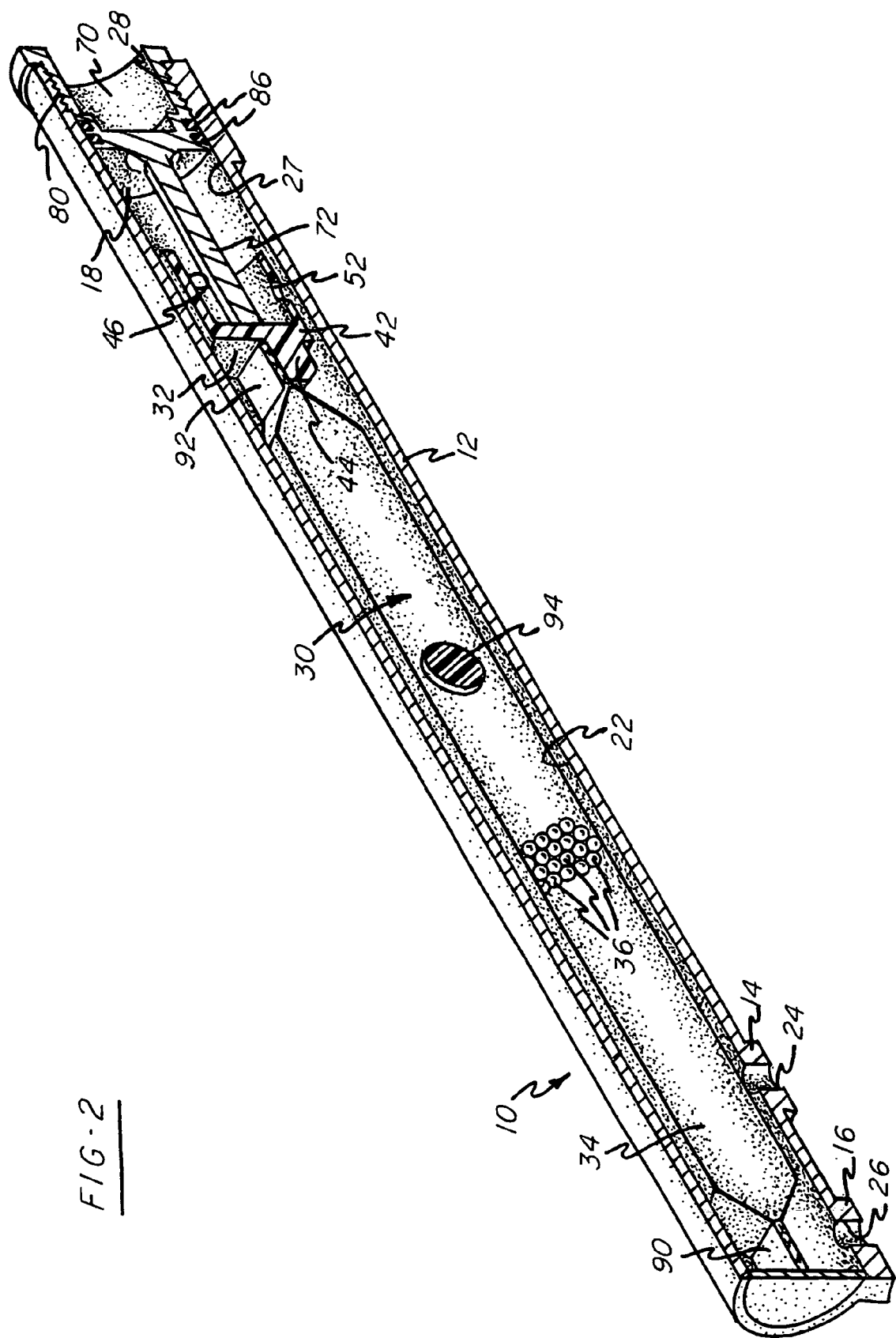
FIG. 2 is sectional view of a first embodiment of the receiver of FIG. 1, taken along the line 2-2 in FIG. 1.

Referring initially to FIG. 1 of the drawings, a receiver 10 includes a canister 12 defining a pair of bosses 14 and 16; a plug 18; and an end panel 20. As shown in FIG. 2, the canister 12 defines a reservoir 22 which communicates through an inlet port 24 extending through the boss 14 and an outlet port extending through the boss 16.

Figure 3:
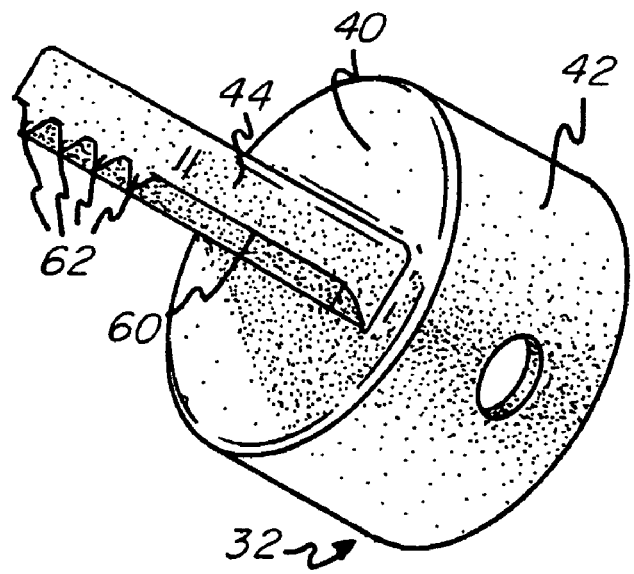
FIG. 3 is a first perspective view of a preferred rigid dongle for use in the embodiment of FIG. 2.
Figure 4:
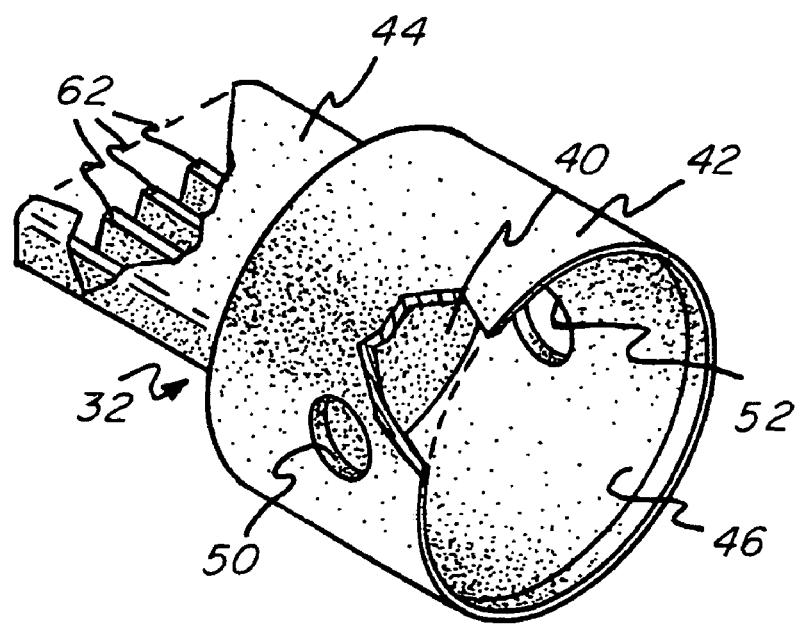
FIG. 4 is a second perspective view of the rigid dongle of FIG. 3, partially cut away to show an interior cavity and energy directors on a tab portion of the rigid dongle.

With continuing reference to FIG. 2, a preferred desiccant cartridge 30 positioned in the reservoir 22 comprises a rigid member or dongle 32 and a porous desiccant pouch or bag 34 containing a powdered or granulated desiccant material 36. The preferred reservoir 22 is substantially cylindrical in shape, having an open end 27 presenting internal threads 28. As shown in FIG. 3, the preferred rigid dongle 32 includes a web portion 40; a cylindrical skirt portion 42; and a tab portion 44 extending transversely from the web portion 40. As shown in FIG. 4, the web portion 40 closes an end of the skirt portion 42 to define a cavity 46. The preferred skirt portion 42 further has a pair of holes 50 and 52 extending from the cavity 46 to an exterior surface of the skirt portion 42 for use in removing the desiccant cartridge 30 (FIG. 2) from the receiver 10 (FIG. 2). As shown in FIGS. 3 and 4, the preferred tab portion 44 defines an engaging surface 60, most preferably flat, and the dongle 32 includes a plurality of energy directors 62 extending from the engaging surface 60.

Figure 5:
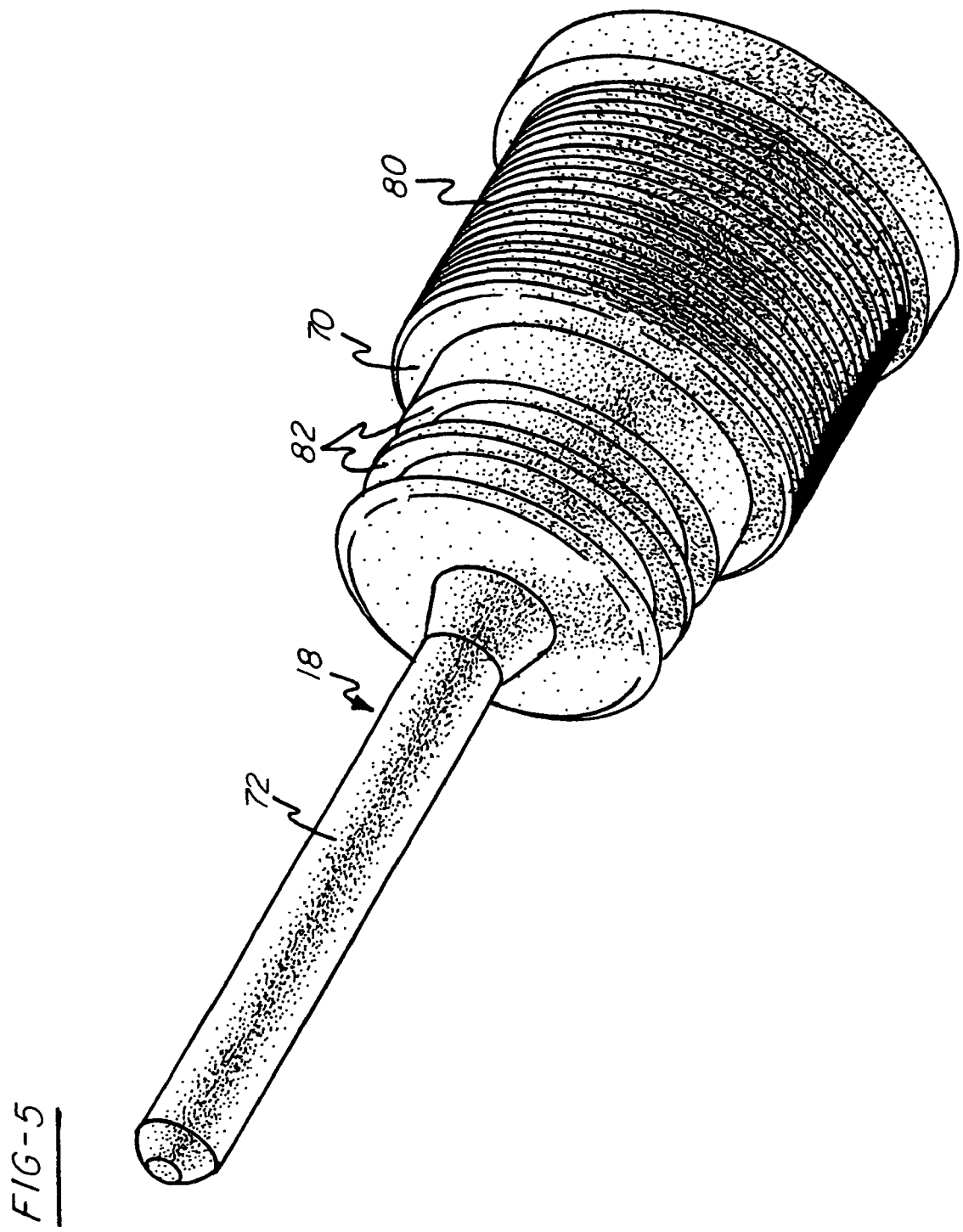
FIG. 5 is a perspective view of a plug or end closure for the receiver of FIG. 2.

Most preferably, as shown in FIG. 2, the end closure 18 serves to position the desiccant cartridge 30 in the reservoir 22. Referring to FIG. 5, the preferred end closure 18 includes a plug portion 70 and an elongated, cylindrical stand-off portion 72 which is relatively thin in the sense that the elongated stand-off portion 72 is thinner in cross-section than the plug portion 72. The plug portion 70 presents external threads 80 for positioning and securing the plug portion 70 and at least one annular groove (two shown at 82 in FIG. 5) for receiving at least one annular seal (two shown at 86 in FIG. 2) such as O-ring seals.

Returning to FIG. 2, the desiccant cartridge 30 is susceptible of a relatively simple method of production. The preferred rigid dongle 32 is formed as a one-piece, plastic casting by means of a conventional casting process. The preferred porous desiccant bag 34 is manufactured from a tube (not shown) of porous polyester material or the like. Most preferably, the porous tube (not shown) is formed of point bonded nylon, specifically PBN-II available from Cerex Advanced Fabrics. The preferred desiccant bag 34 is manufactured by forming a first flat end seal 90 in a first open end (not shown) of the tube (not shown); pouring the desiccant material 36 into the porous tube; and forming a second flat end seal 92 in a second open end (not shown) of the porous tube. Optionally, a fluorescent tracer dye wafer or the like 94 is placed in the porous desiccant bag 34 with the desiccant material 36 so that leaks in the refrigeration system (not shown) of which the receiver 10 is a part can be readily detected by use of an ultraviolet light source (not shown) in a conventional manner. Most preferably, the first and second flat end seals 90, 92 are formed by ultrasonic welding.

Once the porous desiccant bag 34 is manufactured, one of the first and second flat end seals 90, 92 is affixed to the flat engaging surface 60 (FIG. 3) of the tab portion 44 of the rigid dongle 32, most preferably by ultrasonic welding. (The second flat end seal 92 is shown affixed to the tab portion 44 in FIG. 2.) The energy directors 62 (FIGS. 3 and 4) facilitate the welding of the first or second flat end seal 90, 92 to the tab portion 44. Most preferably, the first or second flat end seal 90, 92 which is to be welded to the tab portion 44 is extended away from the bulk of the porous desiccant bag 32 so as to minimize damage to the porous desiccant bag 34 during welding. Although ultrasonic welding is the preferred method for forming the first and second flat end seals 90, 92 and for affixing one of the end seals 90, 92 to the tab portion 44, other suitable techniques (such as thermal or vibration welding) will be apparent to those of ordinary skill in the art.

The design of the desiccant cartridge 30 facilitates installing and positioning the desiccant cartridge 30 in the reservoir 22 of the receiver 10. During installation, the desiccant cartridge 30 is pressed as a unit through the open end 27 of the reservoir 22. Once the desiccant cartridge 30 is installed in the reservoir 22, the end closure 18 is inserted into the open end 27 of the reservoir 22 to seal the open end 27. Most preferably, the plug portion 70 of the end closure 18 and the open end 27 of the reservoir 22 present complementary threads 28, 80 so as to allow the end closure 18 to be threadedly engaged and retained in the open end 27. The one or more annular seals 86 mounted on the end closure 18 inhibit flow between the end closure 18 and the outer surface bounding the open end 27.

The elongated stand-off portion 72 of the end closure 18 serves to position the desiccant cartridge 30 so that the porous desiccant bag 34 straddles the inlet and outlet ports 24, 26. More specifically, the preferred elongated stand-off portion 72 extends into the cavity 46 and abuts against the web portion 42 of the rigid dongle 32. As the end closure 18 is inserted into the open end 27 of the reservoir 22, the elongated stand-off portion 72 presses against the rigid dongle 32 to position the desiccant cartridge 30 in the reservoir 22.

Figure 6:
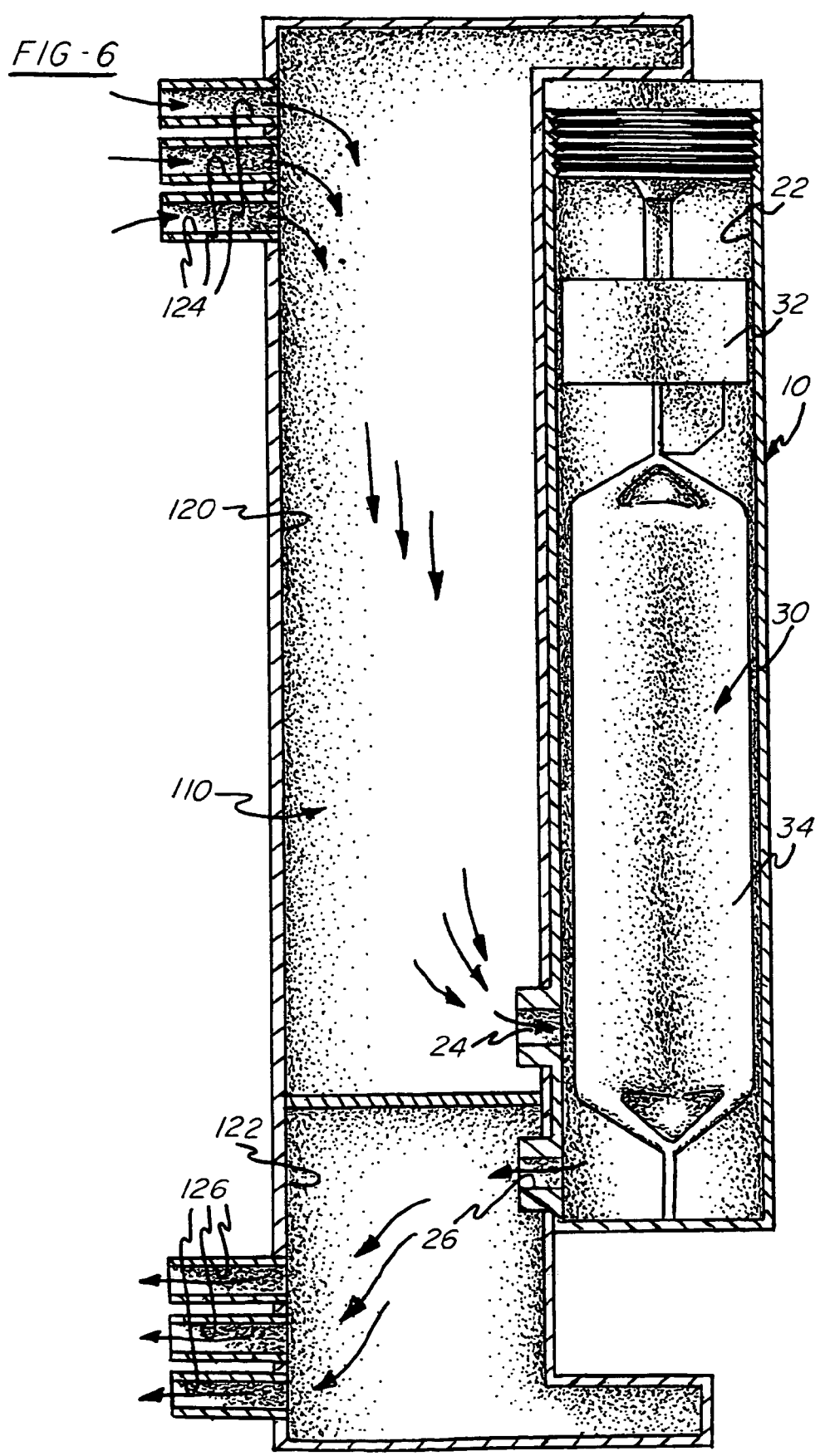
FIG. 6 is a schematic sectional view of a portion of an integral condenser/receiver with the preferred desiccant cartridge positioned in the receiver of the integrated condenser/receiver.

The operation of the receiver 10 (FIG. 1) is illustrated in FIG. 6. In FIG. 6, the receiver 10 is shown juxtaposed with a header tank 110 of a condenser (not shown) for an automotive air conditioner or the like (not shown). The header tank 110 is divided into a first chamber 120 and a second chamber 122. A plurality of passages 124 communicate with the first chamber 120 while another plurality of passages 126 communicate with the second chamber 122. Those skilled in the art will recognize that the configurations of the condenser (not shown) and of the header tank 110 are not critical to the invention.

Refrigerant fluid (and oil and moisture entrained therein, none shown) entering the first chamber 120 through the plurality of passages 124 flows through the inlet port 24 into the reservoir 22 of the receiver 10. The fluid (not shown) within the reservoir 22 enters the sides of the porous desiccant bag 34 and percolates through the desiccant material 36 (FIG. 2). The desiccant material 36 (FIG. 2) adsorbs oil, moisture and other contaminants from the refrigerant fluid (not shown) as the fluid percolates through the porous desiccant bag 34.

It is within the contemplation of the invention to place a collar or the like (not shown) around the porous desiccant bag 34 for inhibiting flow through the reservoir 22 bypassing the porous desiccant bag 34. In accordance with one embodiment, such a collar (not shown) has an external annular groove (not shown) for mounting an annular seal (not shown) for sealing the portion of the reservoir 22 surrounding the porous desiccant bag. Most preferably, such collar (not shown) is positioned over the porous desiccant bag 34 so as to lie between the inlet port 24 and the outlet port 26 when the desiccant cartridge 30 is positioned in the reservoir 22.

The refrigerant fluid (not shown) exiting the porous desiccant bag 34 passes from the reservoir 22 through the outlet port 26. From the outlet port 26, the refrigerant fluid (not shown) proceeds to the condenser (not shown) through the plurality of passages 126.

The design of the desiccant cartridge 30 also facilitates the removal of the desiccant cartridge 30 from the reservoir 22 when the desiccant material 36 is spent. In accordance with one preferred method, one of the holes 50 (FIG. 4), 52 is engaged by a hook or the like (not shown) and then the desiccant cartridge is pulled as a unit through the open end 27 of the reservoir 22.

Figure 7:
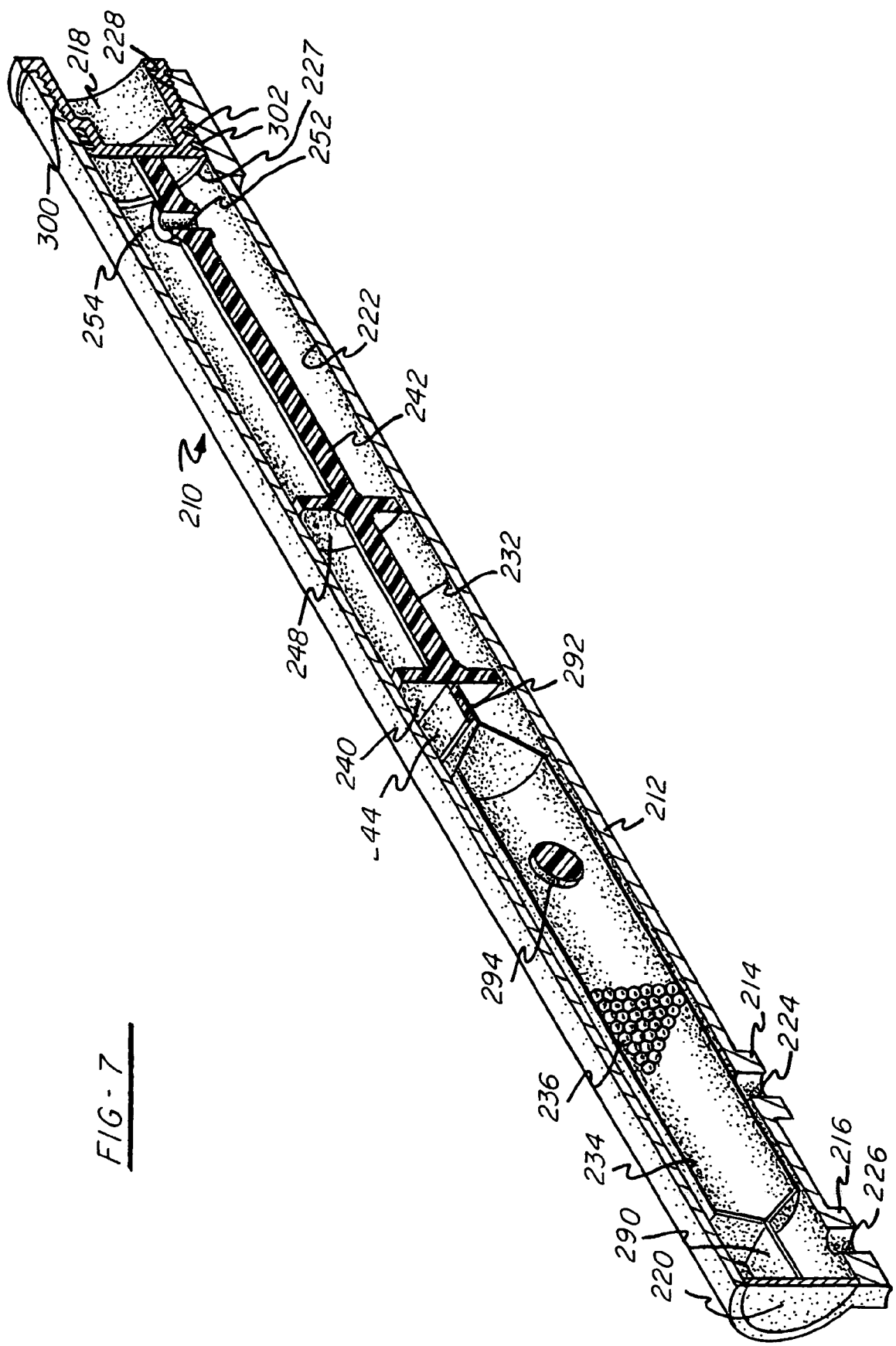
FIG. 7 is sectional view of a second embodiment of the receiver of FIG. 1, taken along the line 2-2 in FIG. 1.

Referring to FIG. 7, a second preferred receiver 210 for an integrated condenser/receiver (not shown) includes a canister 212 defining a pair of bosses 214 and 216; a demountable plug or end closure 218; and an end panel 220. The canister 212 defines a reservoir 222 which communicates with the exterior of the receiver 210 through an inlet port 224 extending through the boss 214 and an outlet port 226 extending through the boss 216. The preferred reservoir 222 is substantially cylindrical in shape, having an open end 227 presenting internal threads 228.

Figure 8:
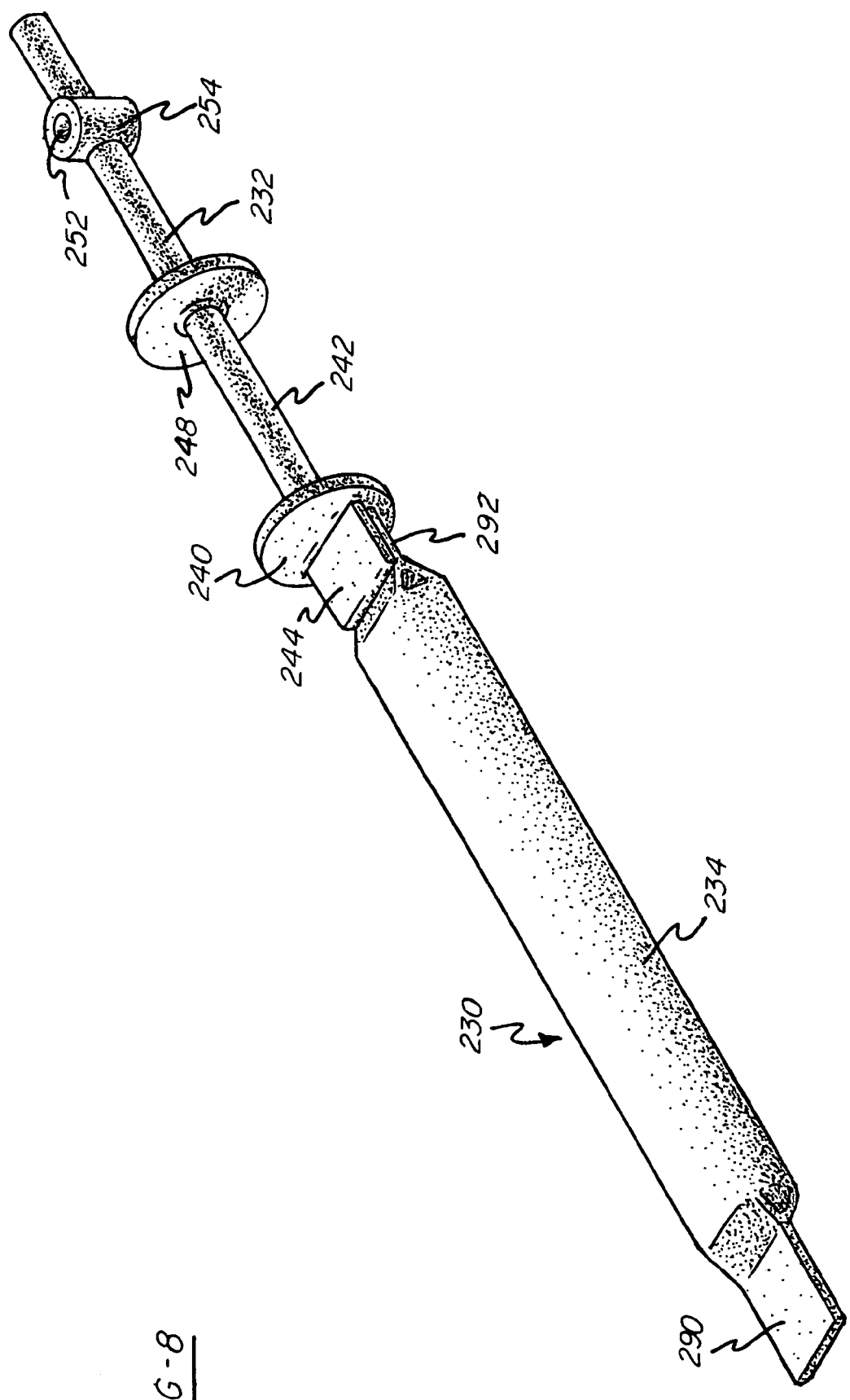
FIG. 8 is a perspective view of a desiccant cartridge for use in the receiver of FIG. 7.

A second preferred embodiment of a desiccant cartridge 230 positioned in the reservoir 222 comprises a rigid stand-off member 232 and a porous desiccant pouch or bag 234 containing a powdered or granulated desiccant material 236. As shown in FIG. 8, the preferred rigid stand-off member 232 includes a web portion or inner pad portion 240; an elongated, relatively thin stand-off portion 242 terminating in the web portion 240; and a tab portion 244 extending transversely from the web portion 240. The preferred elongated stand-off portion 242 includes a flange 248 positioned along the elongated stand-off portion 242 intermediate the web portion 240 and a free end of the elongated stand-off portion 242. The flange 248 is of substantially the same size and shape as the web portion 240. The preferred rigid stand-off member 232 also has an eye 252 extending through a boss 254 formed in the elongated stand-off portion 242.

The desiccant cartridge 230 is susceptible of a relatively simple method of production. The preferred rigid stand-off member 232 is formed as a one-piece, plastic casting by means of a conventional casting process. The preferred porous desiccant bag 234 is manufactured by forming a first flat end seal 290 in a first open end (not shown) of a tube (not shown) of porous polyester felt material or the like; pouring the desiccant material (not shown) into the porous tube; and forming a second flat end seal 292 in a second open end (not shown) of the porous tube. Optionally, a fluorescent tracer dye wafer or the like 294 (FIG. 7) is placed in the porous desiccant bag 134 with the desiccant material (not shown) so that leaks in the system (not shown) in which the receiver 10 (FIG. 1) is used can be readily detected by use of an ultraviolet light source (not shown).

Once the porous desiccant bag 234 is manufactured, one of the first and second flat end seals 290, 292 (the second flat end seal 292 in FIG. 6) is affixed to the tab portion 244 of the rigid stand-off member 232. The first and second flat end seals 290, 292 are preferably formed, and one of the first and second flat end seals 290, 292 is affixed to the tab portion 244, by ultrasonic welding, although other suitable techniques (such as thermal or vibration welding) will be apparent to those of ordinary skill in the art. Most preferably, the first or second flat end seal 290, 292 which is to be welded to the tab portion 244 is extended away from the bulk of the porous desiccant bag 234 so as to minimize damage to the porous desiccant bag 234 during welding.

Returning to FIG. 7, the design of the desiccant cartridge 230 facilitates installing and positioning the desiccant cartridge 230 into the reservoir 222 of the receiver 210. During installation, the desiccant cartridge 230 is pressed as a unit through the open end 227 of the reservoir 222. The rigid stand-off member 232 serves to position the porous desiccant bag 234 so that the porous desiccant bag 234 straddles the inlet and outlet ports 224, 226. Once the desiccant cartridge 230 is installed in the reservoir 222, the plug 218 is inserted into the open end 227 of the reservoir 222 to seal the open end 227. Most preferably, the plug 218 and the open end 227 of the reservoir 222 present complementary threads 228 and 300 so as to allow the plug 218 to be threadedly engaged and retained in the open end 227. One or more annular seals 302 such as O-rings are mounted on the plug 218 to inhibit flow between the plug 218 and the outer surface bounding the open end 227.

The plug 218 abuts against the rigid stand-off member 232 to retain the desiccant cartridge 230 in position in the reservoir 222. Meanwhile, the web portion 240 and the flange 248 are each of substantially the same size and shape as a cross-section of the reservoir 222 so as to promote correct positioning, and inhibit lateral motion, of the desiccant cartridge 230 in the reservoir 222.

The design of the desiccant cartridge 230 also facilitates the removal of the desiccant cartridge 230 from the reservoir 222 when the desiccant material 236 is spent. In accordance with one preferred method, the eye 252 is engaged by a hook or the like (not shown) and then the desiccant cartridge 230 is pulled as a unit from the reservoir 222. Alternatively, the elongated stand-off portion 242 is gripped to permit the desiccant cartridge 230 to be pulled form the reservoir 222 as a unit.

The second preferred desiccant cartridge 230 (FIGS. 7 and 8) operates in substantially the same manner as the first preferred desiccant cartridge 30 (FIGS. 2-4) and shares the same advantages of relatively simple manufacture, installation and removal. In addition, it will be appreciated that the only extraneous material removed from the receiver 10 (FIG. 2), 210 (FIG. 7) with either of the porous desiccant bags 34 (FIG. 2), 234 (FIG. 7) is the rigid dongle 32 (FIGS. 2-4) or rigid stand-off member 232 (FIGS. 7 and 8). It will be apparent that each of the rigid members 32 (FIGS. 2-4), 232 (FIGS. 7 and 8) is relatively simple in design and inexpensive to produce. Thus, it is highly economic to either discard the desiccant cartridge 30 (FIGS. 2-4), 230 (FIGS. 7 and 8) as a unit or to destroy the desiccant cartridge 30 (FIGS. 2-4), 230 (FIGS. 7 and 8) to recover the desiccant material 36 (FIG. 2), 236 (FIG. 7) for either regeneration or separate disposal.

Figure 9:
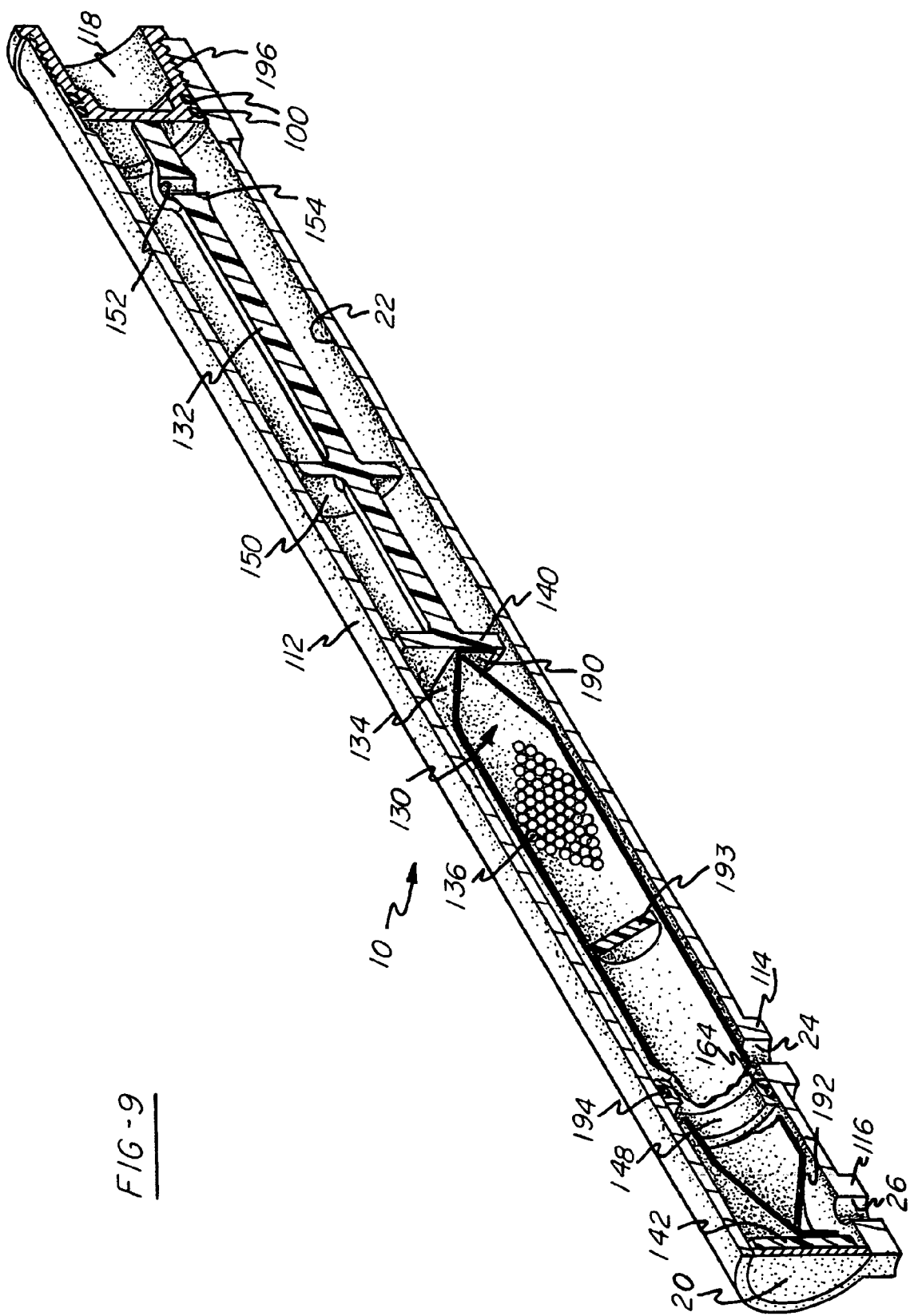
FIG. 9 is sectional view, taken along line 2-2 in FIG. 1, of the integrated condenser/receiver of FIG. 1, wherein the desiccant cartridge includes a rigid stand-off member and a porous desiccant bag which is partially broken away to reveal a portion of the rigid stand-off member.
Figure 10:
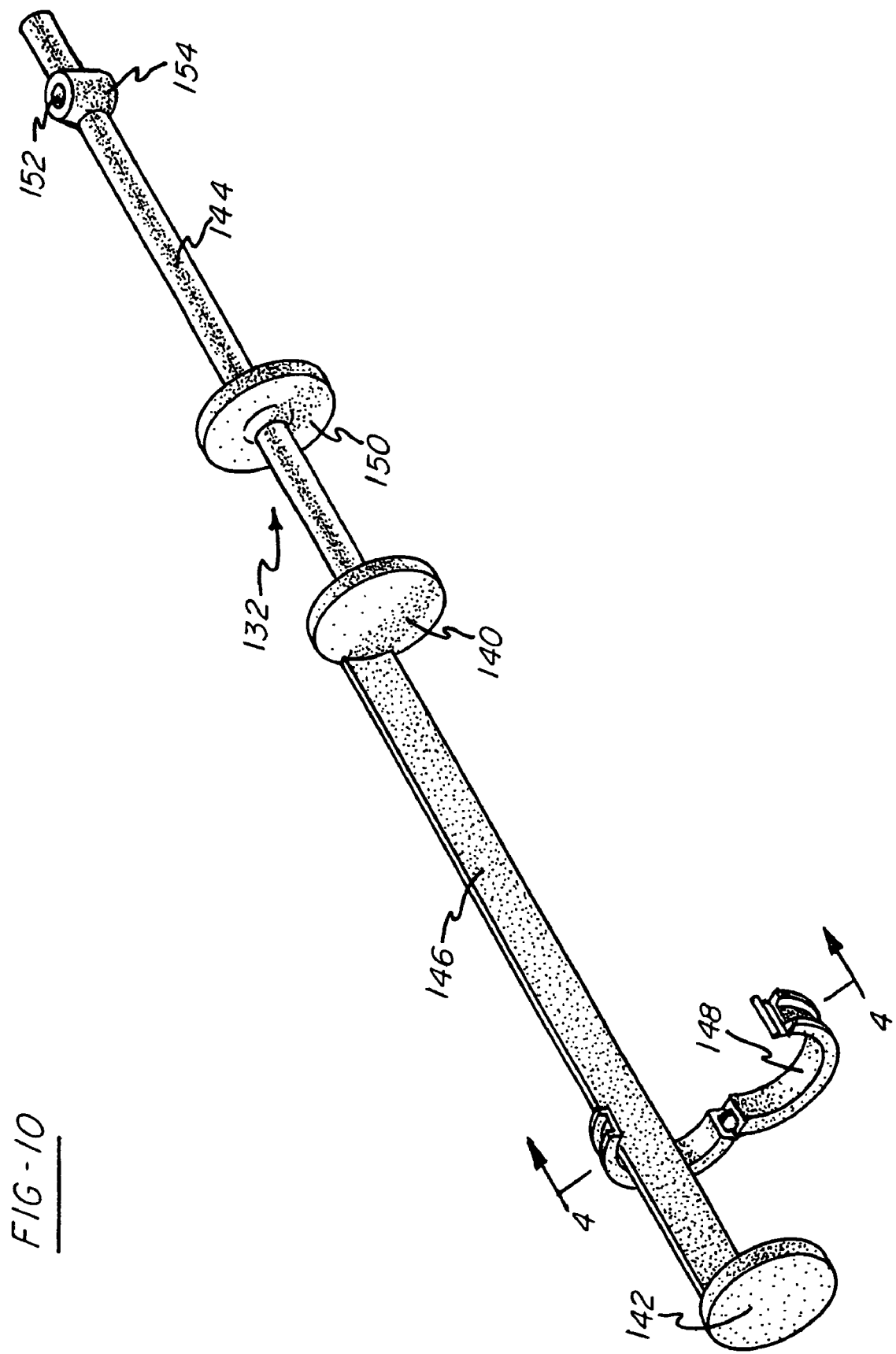
FIG. 10 is a perspective view of a rigid stand-off member for the first preferred desiccant cartridge shown in FIG. 9.

FIGS. 9-13 illustrate another embodiment of the desiccant cartridge 130 comprising a rigid stand-off member 132 and a porous desiccant pouch or bag 134 containing a powdered or granulated desiccant material 136. As shown in FIG. 10, a preferred rigid stand-off member 132 includes an inner pad portion 140; an outer pad portion 142; an elongated stand-off portion 144 terminating in the inner pad portion 140; a spacing rib portion 146 eccentrically spacing the inner and outer pad portions 140, 142; and a clamp portion 148 supported by the spacing rib 146. The elongated stand-off portion 144 and the spacing rib portion 146 extend from opposite sides of the inner pad portion 140 in opposite directions. The preferred elongated stand-off portion 144 includes a flange 150 and an eye 152 surrounded by a rigid boss 154.

Figure 11:
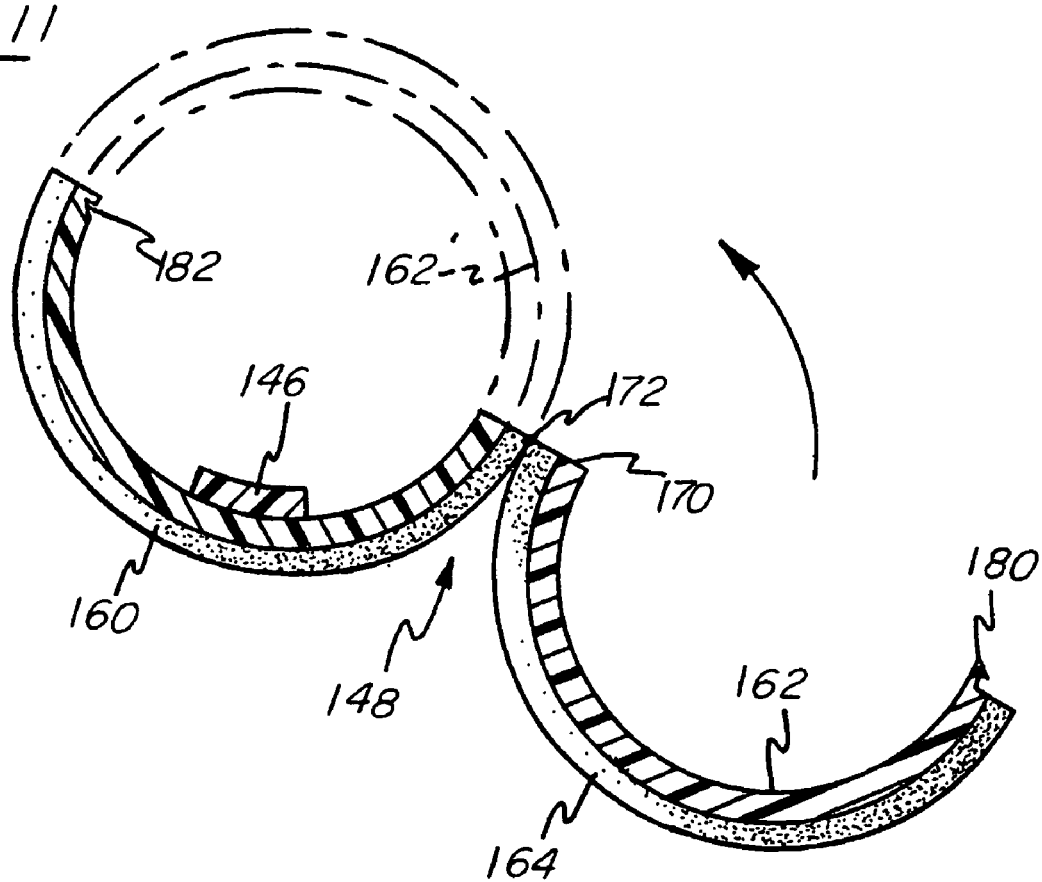
FIG. 11 is a sectional view of a clamp portion of the rigid stand-off member of FIGS. 9 and 10 in an open position, with the closed position suggested in phantom.

As shown in FIG. 11, the clamp portion 148 includes a first clamping jaw 160 supported by the spacing rib portion 146 and a second clamping jaw 162 supported by the first clamping jaw 160. The first and second clamping jaws 160, 162 also cooperate to define an annular channel 164.

More specifically, the first clamping jaw 160 and the second clamping jaw 162 are separated by a partial cleft 170 which leaves thin plastic connectors 172 (only one shown) defining a living hinge between the first and second clamping jaws 160, 162. The second clamping jaw 162 is able to pivot about the thin plastic connectors 172 between an open position (shown by first and second clamping jaws 160, 162) and a closed position (shown by first and second clamping jaws 160, 162').

The first and second clamping jaws 160, 162 mount complementary detents 180, 182 for engagement to secure the first and second clamping jaws 160, 162 in the closed position. As shown in FIG. 11, one configuration of the complementary detents 180, 182 includes a clasp 180 mounted by the second clamping jaw 162 and a complementary socket 182 mounted by the first clamping jaw 60 for receipt of the clasp 180. The design of the complementary detents 180, 182 is not critical to the invention and other suitable detent configurations will be apparent to those of ordinary skill in the art.

Returning to FIG. 9, the desiccant cartridge 130 is susceptible of a relatively simple method of production. The preferred rigid stand-off member 132 is formed as a one-piece, plastic casting by means of a conventional casting process. The preferred porous desiccant bag 134 is manufactured by forming a first flat end seal 190 in a first open end (not shown) of a tube (not shown) of porous polyester felt material or the like; pouring the desiccant material 136 into the porous tube; and forming a second flat end seal 192 in a second open end (not shown) of the porous tube. Most preferably, the porous tube (not shown) is formed of point bonded nylon, specifically PBN-II available from Cerex Advanced Fabrics. Other materials such as porous polyester felt or others may also be mentioned. The first and second flat end seals 190, 192 of the tube are formed by ultrasonic welding. Other suitable techniques (such as thermal or vibration welding) will be apparent to those of ordinary skill in the art. Optionally, a fluorescent tracer dye wafer or the like 193 is placed in the porous desiccant bag 134 with the desiccant material 136 so that leaks in the system (not shown) in which the receiver 10 is used can be readily detected by use of an ultraviolet light source (not shown).

Once the rigid stand-off member 132 and the porous desiccant bag 134 are formed, the porous desiccant bag 134 is secured to the rigid stand-off member 132. Most preferably, one or both of the first and second flat end seals 190, 192 are secured to the inner and outer pad portions 140, 142 by ultrasonic welding, although other suitable techniques (such as thermal or vibration welding) will be apparent to those of ordinary skill in the art. The clamp portion 148 is closed about a middle portion of the porous desiccant bag 134 to secure the porous desiccant bag to the spacer rib portion 146 (FIGS. 10 and 11). This serves to immobilize the porous desiccant bag 134 relative to the rigid stand-off member 132 to facilitate installation and removal of the desiccant cartridge 130. Finally, an annular seal 194 such as an "O" 0 ring is placed in the annular channel 164 defined by the clamp portion 148.

Figure 12:
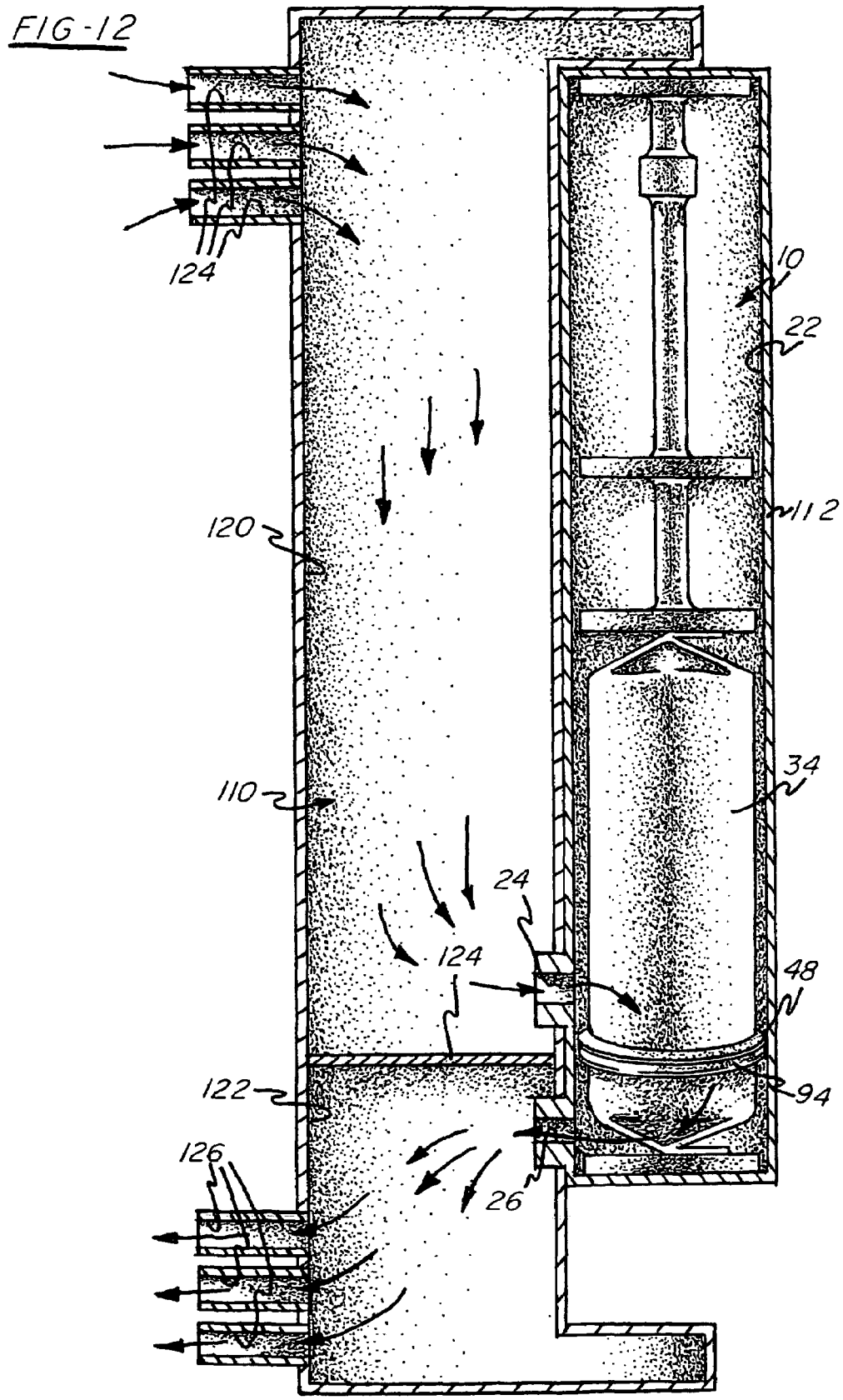
FIG. 12 is a schematic sectional view of a portion of an improved integrated condenser/receiver in accordance with the invention.

The operation of the receiver 10 (FIG. 1) is illustrated in FIG. 12 and is similar to that shown in FIG. 6. In FIG. 12, the receiver 10 is shown juxtaposed with a header tank 110 of a condenser (not shown) for an automotive air conditioner or the like (not shown). The header tank 110 is divided into a first chamber 120 and a second chamber 122. A plurality of passages 124 communicate with the first chamber 120 while another plurality of passages 126 communicate with the second chamber 122. Those skilled in the art will recognize that the configurations of the condenser (not shown) and of the header tank 110 are not critical to the invention.

Refrigerant fluid (and the oil and moisture entrained therein, none shown) entering the first chamber 120 through the plurality of passages 124 flows through the inlet port 24 into the reservoir 22 of the receiver 10. The fluid (not shown) within the reservoir 22 enters the sides of the porous desiccant bag 134 and percolates through the desiccant material 136 (FIG. 9). The desiccant material 136 (FIG. 9) adsorbs oil, moisture and other contaminants from the refrigerant fluid (not shown) as the fluid percolates through the porous desiccant bag 134. Meanwhile, the annular seal 194 mounted on the clamp portion 148 of the rigid stand-off member 132 acts as a baffle to inhibit flow bypassing the porous desiccant bag 134. The refrigerant fluid (not shown) leaves the porous desiccant bag 134 downstream of the clamp portion 148 and passes from the reservoir 22 through the outlet port 26, whence it flows to the condenser (not shown) through the plurality of passages 132.

Returning to FIG. 9, the design of the desiccant cartridge 130 facilitates installing and positioning the desiccant cartridge 130 into the reservoir 22 of the receiver 10. During installation, the desiccant cartridge 130 is pressed as a unit through an open end 196 of the canister 112 until the outer pad portion lies near, or in abutment with, the end panel 20. The elongated stand-off portion 132 serves to position the porous desiccant bag 134 so that the porous desiccant bag 134 straddles the inlet and outlet ports 24, 26. Most preferably, the desiccant cartridge 130 is positioned so that the clamp portion 148 lies between the inlet and outlet ports 24, 26. When so arranged, the annular seal 194 engages an inner surface of the canister 112 bounding the reservoir 22 so as to inhibit flow between the inlet and outlet ports 24, 26 bypassing the porous desiccant bag 134.

Once the desiccant cartridge 130 is installed in the reservoir 22, the plug 118 is inserted into the open end 196 of the reservoir 22 to seal the open end 196. Most preferably, the plug 118 and the open end 196 of the reservoir 22 present complementary threads so as to allow the plug 118 to be threadedly engaged and retained in the open end 196. One or more annular seals 100 inhibit flow between the plug 118 and the outer surface bounding the open end 196.

The plug 118 abuts against the elongated stand-off member 132 to retain the desiccant cartridge 130 in position in the reservoir 22. Meanwhile, the inner pad portion 140, the outer pad portion 142 and the flange 150 are each configured in size and shape to closely fit within the reservoir 22 so as to promote correct positioning, and inhibit lateral motion, of the desiccant cartridge 130 in the reservoir 22.

The design of the desiccant cartridge 130 also facilitates the removal of the desiccant cartridge 130 from the reservoir 22 when the desiccant material 136 is spent. In accordance with one preferred method, the desiccant cartridge 130 from the reservoir 22, the eye 152 is engaged by a hook or the like (not shown) and then the desiccant cartridge 130 is pulled as a unit from the reservoir 22. Alternatively, the elongated stand-off portion 144 is gripped to permit the desiccant cartridge 130 to be pulled form the reservoir 22 as a unit.

Figure 13:
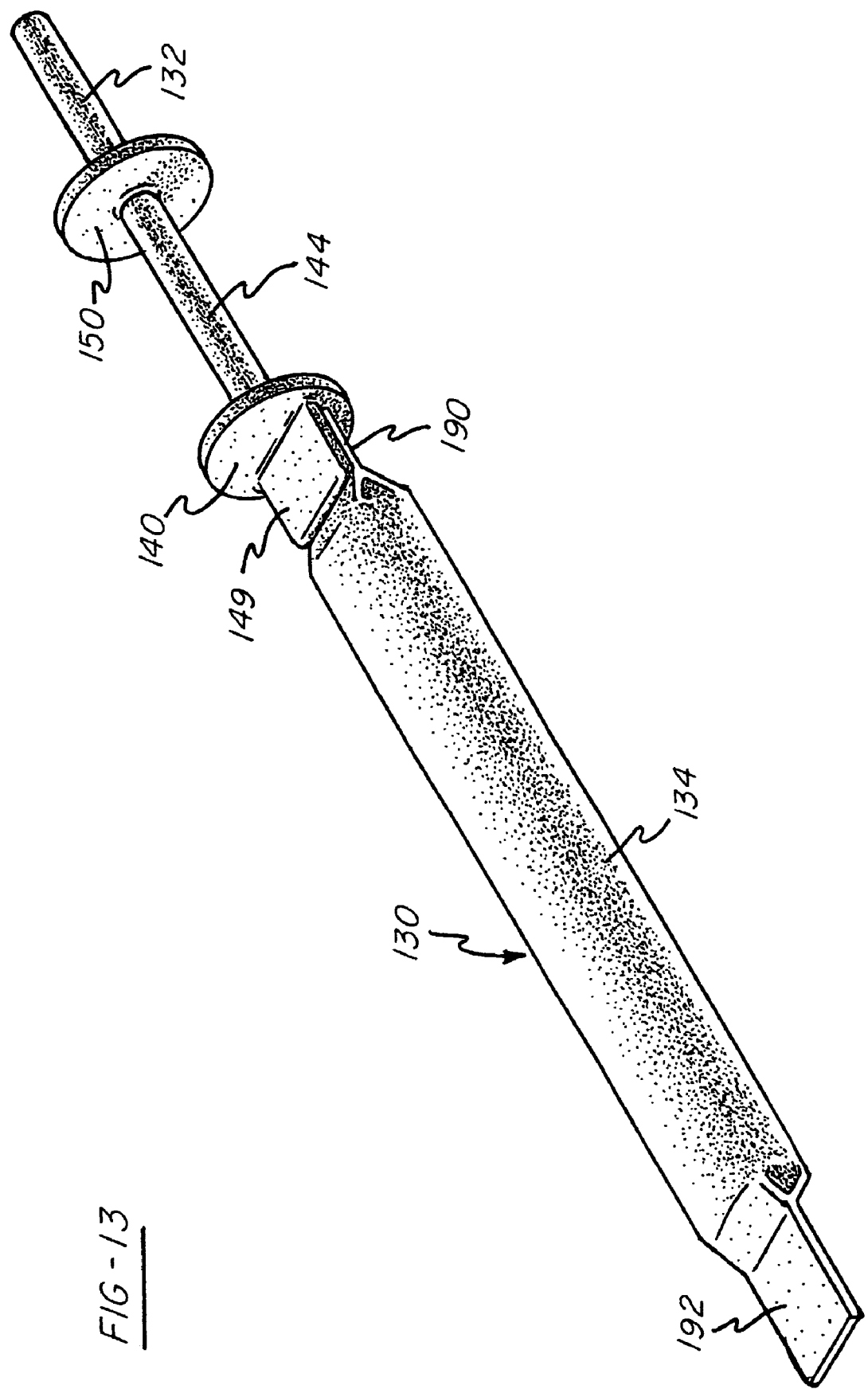
FIG. 13 is a perspective view of a second embodiment of a desiccant cartridge for use in a receiver such as that shown in FIG. 1.

FIG. 13 shows another preferred embodiment of a desiccant cartridge 130 for installation in a receiver 10 of the same design as the receiver 10 in FIG. 1 and FIG. 9. The desiccant cartridge 130 comprises a rigid stand-off member 132 and a porous desiccant pouch or bag 134. The preferred rigid stand-off member 132 includes an inner pad portion 140; an elongated stand-off portion 144 terminating in the inner pad portion 140; and a tab portion 149 extending transversely from the inner pad portion 140. The preferred elongated stand-off portion 144 includes a flange 150 which cooperates with the inner pad portion 140 to promote correct positioning, and inhibit lateral motion, of the desiccant cartridge 130 in the reservoir 22.

The desiccant cartridge 130 of FIG. 13 is susceptible of a relatively simple method of production. The preferred rigid stand-off member 132 is formed as a one-piece, plastic casting by means of a conventional casting process. The preferred porous desiccant bag 134 is manufactured by forming a first flat end seal 190 in a first open end (not shown) of a tube (not shown) of porous polyester felt material or the like; pouring the desiccant material (not shown) into the porous tube; and forming a second flat end seal 192 in a second open end (not shown) of the porous tube. Optionally, a fluorescent tracer dye wafer or the like (not shown) is placed in the porous desiccant bag 134 with the desiccant material (not shown) so that leaks in the system (not shown) in which the receiver 10 (FIG. 1) is used can be readily detected by use of an ultraviolet light source (not shown). Once the porous desiccant bag 134 is manufactured, one of the first and second flat end seals 190, 192 (the first flat end seal 190 in FIG. 13) is affixed to the tab portion 149 of the rigid stand-off member 132. The first and second flat end seals 190, 192 are preferably formed, and one of the first and second flat end seals 190, 192 is affixed to the tab portion 149, by ultrasonic welding, although other suitable techniques (such as thermal or vibration welding) will be apparent to those of ordinary skill in the art. Most preferably, the first or second flat end seal 190, 192 which is to be welded to the tab portion 149 is extended away from the bulk of the porous desiccant bag 134, so as to minimize damage to the porous desiccant bag 134 during welding.

Figure 14:
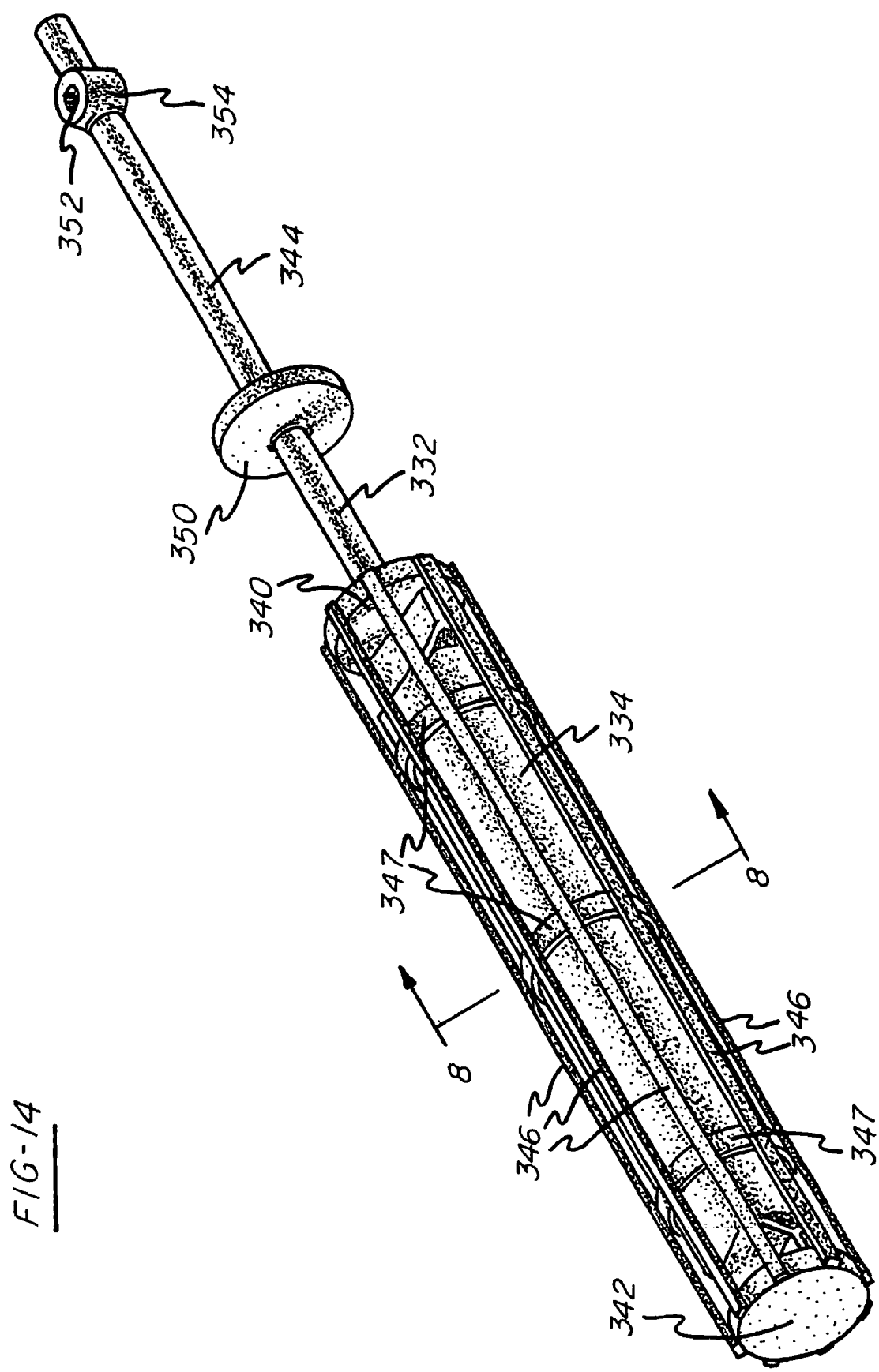
FIG. 14 is a perspective view of a third embodiment of a desiccant cartridge for use in a receiver such as that shown in FIG. 1.
Figure 15:
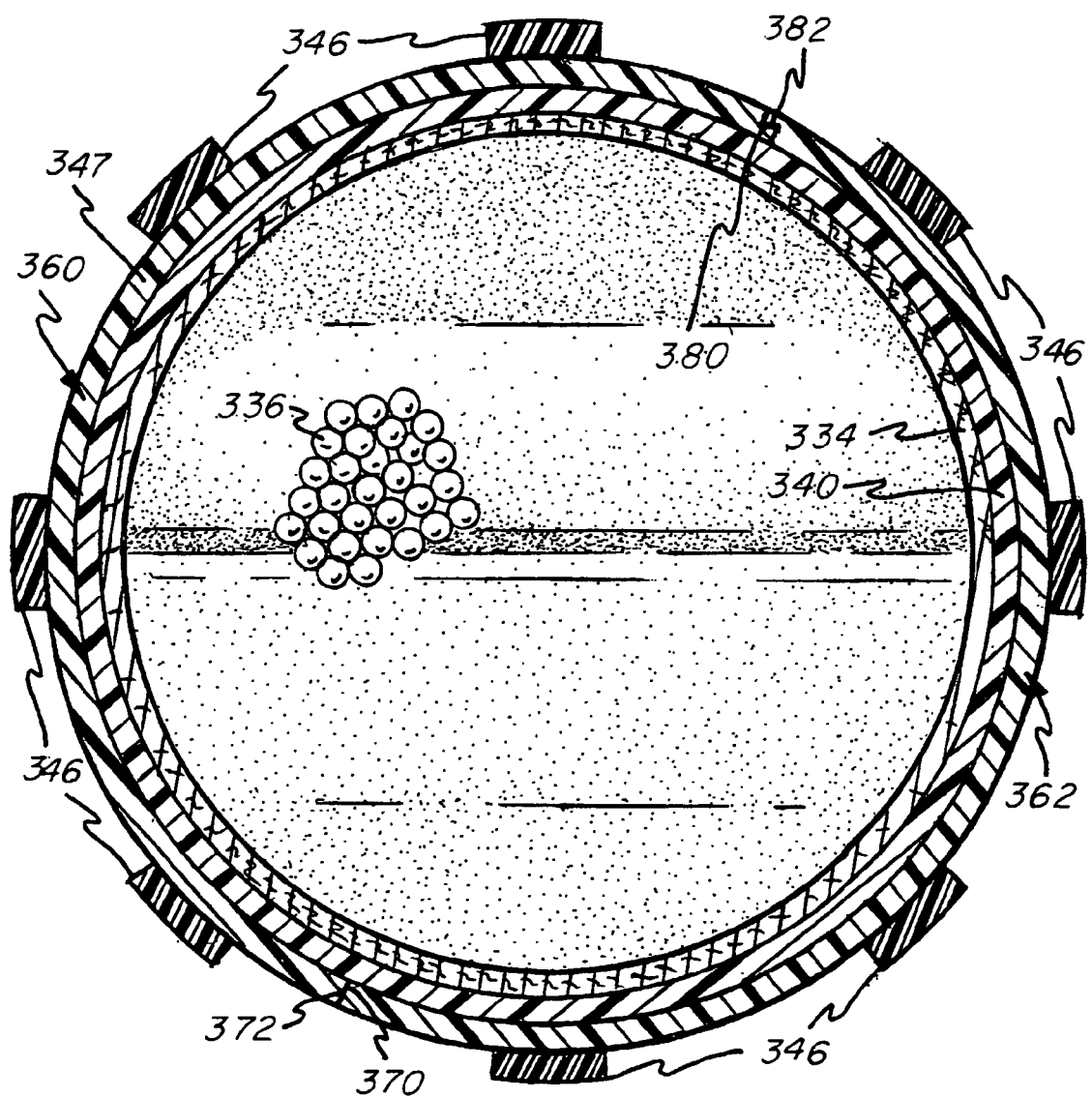
FIG. 15 is a sectional view of the desiccant cartridge of FIG. 14, taken along the line 8-8 in FIG. 14.
Figure 16:
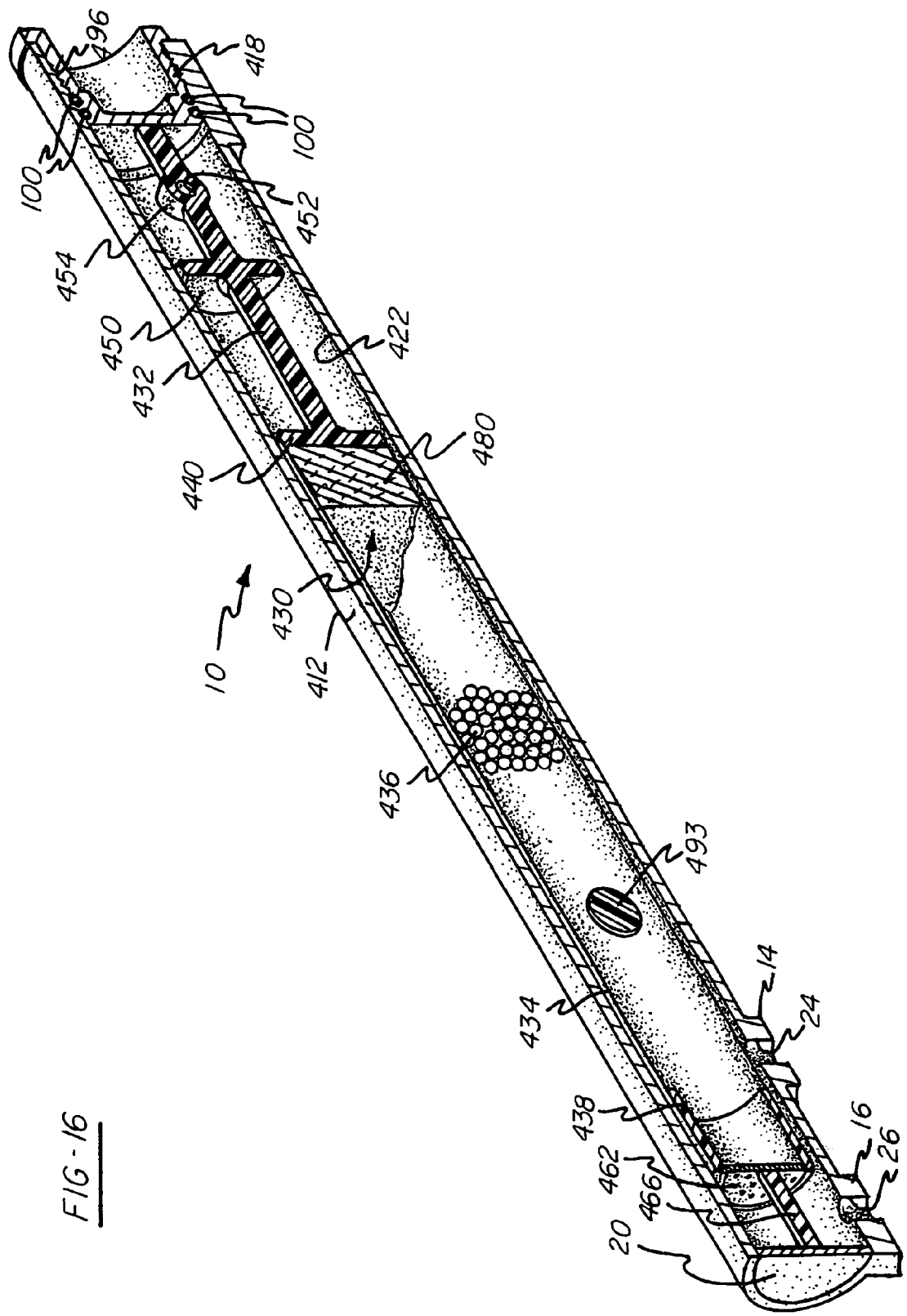
FIG. 16 is sectional view of the receiver of FIG. 1, taken along the line 1-1 in FIG. 1.

FIG. 14 shows yet another embodiment of a desiccant cartridge 330 for installation in a receiver of the same design as the receiver 10 in FIGS. 1 and 9. The desiccant cartridge 330 comprises a rigid stand-off member 332 and a porous desiccant pouch or bag 334 containing a powdered or granulated desiccant material 336 (FIG. 15). The preferred rigid stand-off member 332 includes an inner pad portion 340; an outer pad portion 342; an elongated stand-off portion 344 terminating in the inner pad portion 340; and a plurality of annularly-arrayed spacer bars 346 extending between the inner and outer pad portions 340, 342 to define, in cooperation with a plurality of hoops 347 extending transversely of the spacer bars 346, a cage portion 348. The preferred elongated stand-off portion 344 includes a flange 350 and an eye 352 surrounded by a rigid boss 354.

As shown in FIG. 15, the cage portion 348 includes a first cage element 360 and a second cage element 362. The first cage element 360 is supported at opposite ends of the spacer bars 346 by the inner and outer pads 340, 342. The second cage element 362 is supported by the first cage element 360. More specifically, the first cage element 360 and the second cage element 362 are separated by partial radial clefts 370 (only one shown) through each of the hoops 347 (only one shown) which leave thin plastic connectors 372 (only one shown) defining living hinges between the first and second cage elements 360, 362. The second cage element 362 is able to pivot about the thin plastic connectors 372 between an open position (not shown) and a closed position (shown in FIG. 15).

The first and second cage elements 360, 362 mount complementary detents 380 and 382 for engagement to secure the first and second cage elements 360, 362 in the closed position. As shown in FIG. 15, one configuration of the complementary detents 380, 382 includes a clasp 380 mounted by the second cage element 362 and a complementary socket 382 mounted by the first cage element 360 for receipt of the clasp 380. The design of the complementary detents 380, 382 is not critical to the invention and other suitable detent configurations will be apparent to those of ordinary skill in the art.

The desiccant cartridge 330 is also susceptible of a relatively simple method of production. The preferred rigid stand-off member 332 is formed as a one-piece, plastic casting by means of a conventional casting process. The porous desiccant bag 334 preferably is manufactured in the same manner as the porous desiccant bags 34 and 134 of previous embodiments so as to leave first and second flat end seals 390, 392. One or both of the first and second flat end seals 390, 392 are secured to the inner and outer pad portions 340, 342 by ultrasonic welding, although other suitable techniques (such as thermal or vibration welding) will be apparent to those of ordinary skill in the art. Then the cage portion 348 is closed about the porous desiccant bag 334, thereby immobilizing the porous desiccant bag 334 relative to the rigid stand-off member 332 to facilitate installation and removal of the desiccant cartridge 130.

The embodiments of FIG. 13 and FIGS. 14 and 15 operate in substantially the same manner as the embodiment of FIGS. 9-12 and share the same advantages of relatively simple installation and removal. In particular, it will be appreciated that the only extraneous material removed from the receiver 10 with any of the porous desiccant bags 134 (FIG. 9 and FIG. 13) and 334 (FIG. 14) is the rigid stand-off member 132 (FIGS. 9-11), 132 (FIG. 13), 332 (FIGS. 14 and 15). It will be apparent that each of the rigid stand-off members 132, 332 is relatively simple in design and inexpensive to produce. Thus, it is highly economic to either discard the desiccant cartridge 130,330 as a unit or to destroy the desiccant cartridge 130, 330 to recover the desiccant material 136, 336 for either regeneration or separate disposal.

With reference to FIGS. 16-19, another exemplary embodiment of a preferred desiccant cartridge 430 is illustrated. The desiccant cartridge is similar to previous embodiments in that it is positioned in the reservoir 422 and comprises a rigid stand-off member 432 and a porous desiccant pouch or bag 434 containing a powdered or granulated desiccant material 436. However, the embodiment of FIGS. 16-19 also includes a cylindrical cap 438.

Figure 18:
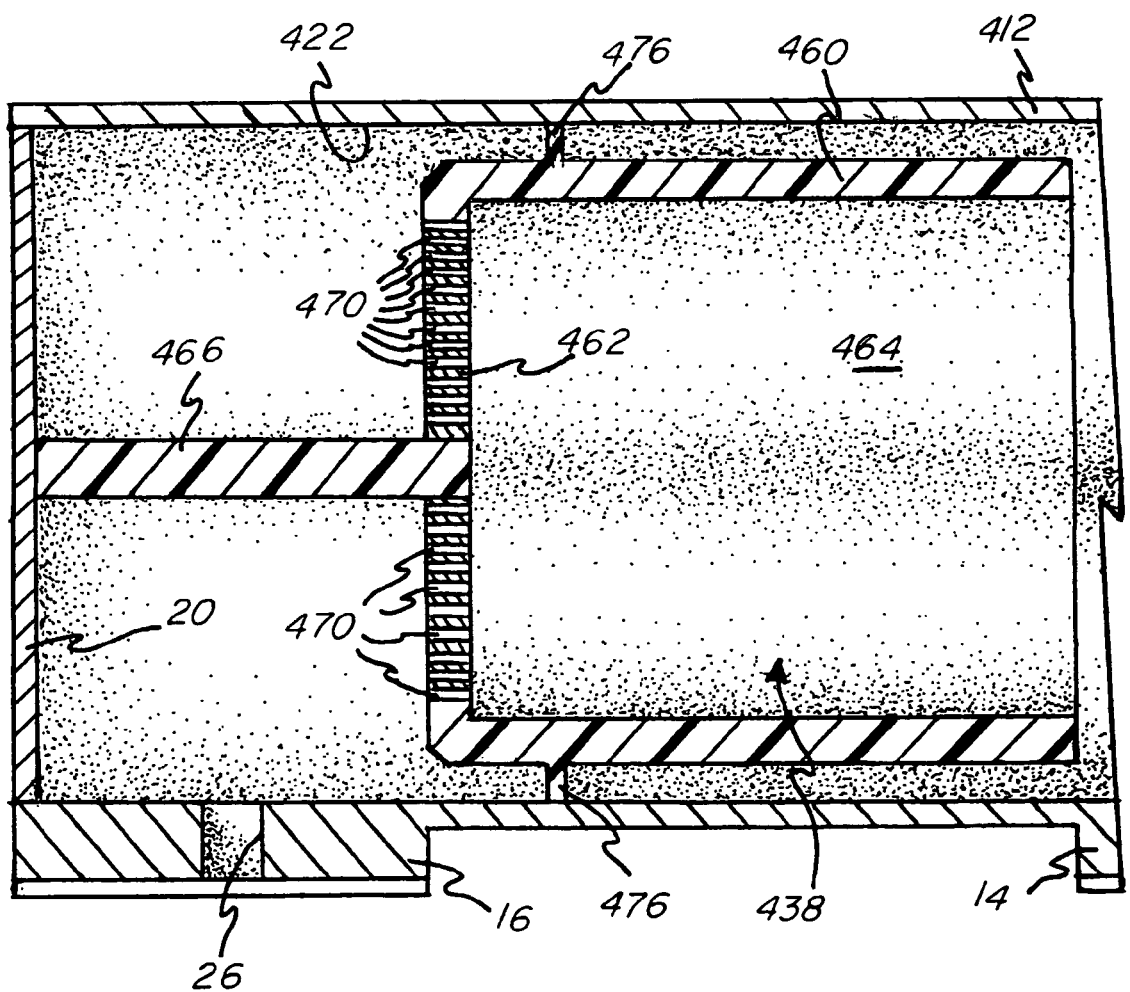
FIG. 18 is an exploded view of a portion of the sectional view of FIG. 16, showing a rigid cap of the preferred desiccant cartridge of FIG. 17.

Referring to FIG. 18, the cap 438 includes an annular sleeve portion 460; a web portion 462 closing a distal end of the annular sleeve portion 460 to define an interior cavity 464; and a spacer portion 466 in the form of a cylindrical spacer bar extending outwardly from the web portion 462. A plurality of small holes 470 through the web portion 462 communicate between the cavity 464 and the exterior of the cap 438. The annular sleeve portion 460 mounts an annular seal or collar portion 476 which extends radially outwardly from the sleeve portion 460. Most preferably, the annular seal portion 476 is sufficiently thin to provide the annular seal portion 476 with a degree of resilient flexibility when subjected to shear forces.

Returning to FIG. 17, the desiccant cartridge 430 is susceptible of a relatively simple method of production. The preferred rigid stand-off member 432 is formed as a one-piece, plastic casting by means of a conventional casting process. The preferred porous desiccant bag 434 is manufactured by sealing a first open end (not shown) of a tube (not shown) of porous polyester felt material or the like; pouring the desiccant material (not shown) into the porous tube; and forming a flat end seal 480 in a second open end (not shown) of the porous tube. Once the porous desiccant bag 434 is manufactured, one of the flat end seal 480 is affixed to the tab portion 446 of the rigid stand-off member 432. The flat end seals 480 is preferably formed and affixed to the tab portion 446 by ultrasonic welding, although other suitable techniques (such as thermal or vibration welding) will be apparent to those of ordinary skill in the art.

The operation of the receiver 10 (FIG. 1) is illustrated in FIG. 19. In FIG. 19, the receiver 10 is shown juxtaposed with a header tank 110 of a condenser (not shown) for an automotive air conditioner or the like (not shown). The header tank 110 is divided into a first chamber 120 and a second chamber 122. A plurality of passages 130 communicate with the first chamber 120 while another plurality of passages 132 communicate with the second chamber 122. Those skilled in the art will recognize that the configurations of the condenser (not shown) and of the header tank 110 are not critical to the invention.

Figure 17:
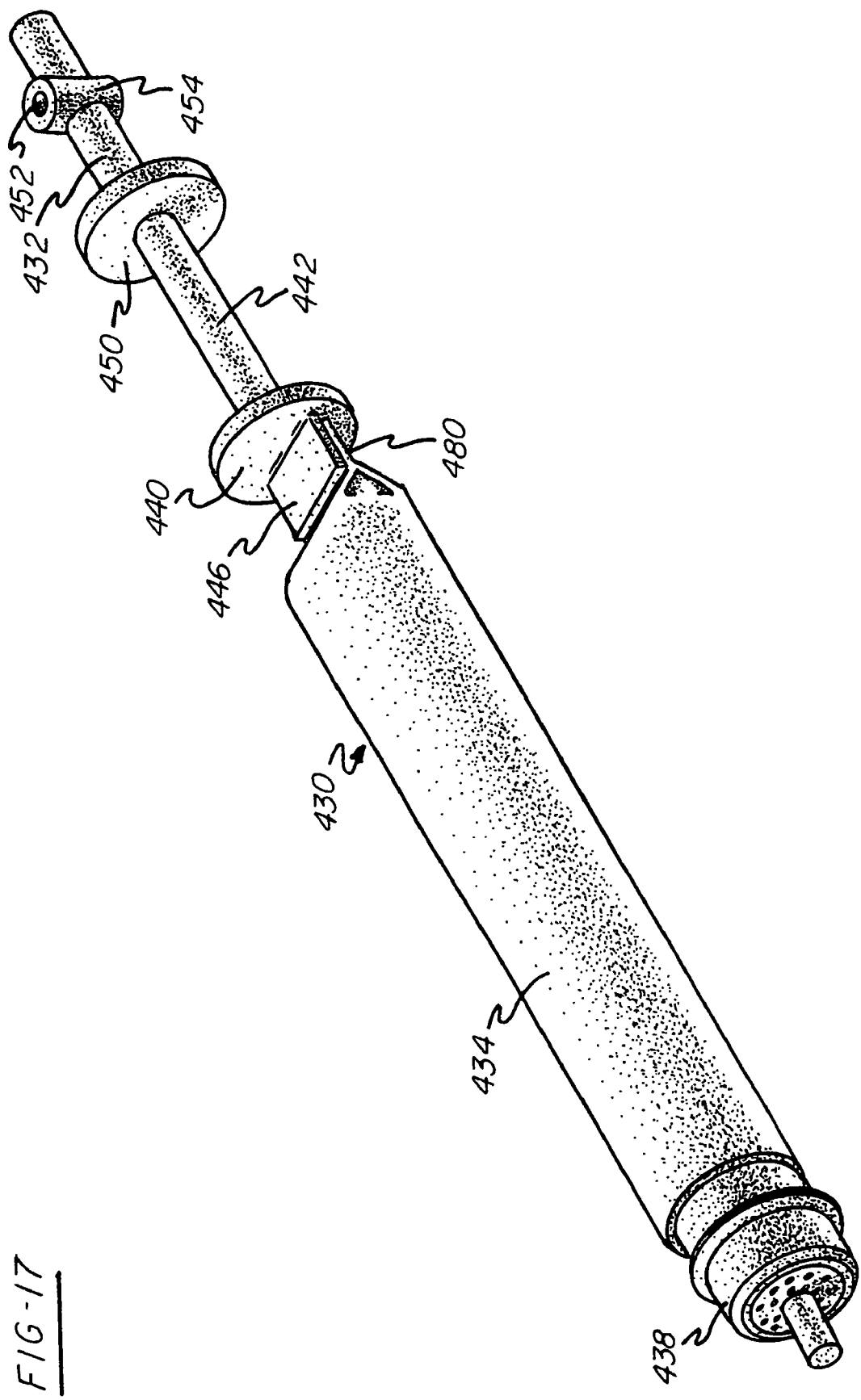
FIG. 17 is a perspective view of a preferred desiccant cartridge in accordance with the invention, which is also shown in section in FIG. 16.

Refrigerant fluid (and the oil and moisture entrained therein, none shown) entering the first chamber 120 through the plurality of passages 130 flows through the inlet port 24 into the reservoir 422 of the receiver 10. The fluid (not shown) within the reservoir 422 enters the sides of the porous desiccant bag 434 and percolates through the desiccant material 436 (FIG. 17). The desiccant material 436 (FIG. 17) adsorbs oil, moisture and other contaminants from the refrigerant fluid (not shown) as the fluid percolates through the porous desiccant bag 434. Meanwhile, the annular seal 476 of the rigid cap 438 acts as a baffle to inhibit flow bypassing the porous desiccant bag 434.

The refrigerant fluid (not shown) flows out of the desiccant bag 434 through the plurality of holes 470 (FIG. 18) through the web portion 462 (FIG. 18) of the rigid cap 438. It is desirable that the plurality of holes 470 (FIG. 18) be so dimensioned as to permit the flow of refrigerant fluid (not shown) while retaining the desiccant material 436 (FIG. 16) and inhibiting the flow of moisture, oil and other contaminants. In this manner, the plurality of holes 470 (FIG. 18) provides additional filtering of the refrigerant fluid (not shown) which percolates through the desiccant material 436 (FIG. 16) in the porous desiccant bag 434. Most preferably, the desiccant material 436 (FIG. 16) is in the form of grains defining maximum effective grain diameters; the plurality of holes 470 (FIG. 18) define maximum effective hole diameters; and the maximum effective hole diameters are substantially no greater than the maximum effective grain diameters so as to retain the desiccant material 436 (FIG. 16) and inhibit the flow of moisture, oil and other contaminants (not shown) through the outlet port 26.

The refrigerant fluid (not shown) passes from the reservoir 422 through the outlet port 26. From the outlet port 26, the refrigerant fluid (not shown) proceeds to the condenser (not shown) through the plurality of passages 132

Returning to FIG. 16, the design of the desiccant cartridge 430 facilitates installing and positioning the desiccant cartridge 430 in the reservoir 422 of the receiver 10. During installation, the desiccant cartridge 430 is pressed as a unit through an open end 496 of the canister 412 until the spacer portion 466 of the cap 438 abuts against the end panel 20. The spacer portion 466 of the cap 438 and the elongated stand-off portion 432 of the rigid stand-off member 432 cooperate to position the porous desiccant bag 434 so that the porous desiccant bag 434 straddles the inlet and outlet ports 24, 26.

Once the desiccant cartridge 430 is installed in the reservoir 422, the plug 418 is inserted into the open end 496 of the reservoir 422 to seal the open end 96. Most preferably, the plug 418 and the open end 496 of the reservoir 422 present complementary threads so as to allow the plug 418 to be threadedly engaged and retained in the open end 496. One or more annular seals 100 inhibit flow between the plug 418 and the outer surface bounding the open end 496.

The plug 418 abuts against the elongated stand-off member 432 to retain the desiccant cartridge 430 in position in the reservoir 422. Meanwhile, the inner pad portion 440 and the flange 450 are each configured in size and shape to closely fit within the reservoir 422 so as to cooperate with the annular seal portion 476 of the cap 438 to promote correct positioning, and inhibit lateral motion, of the desiccant cartridge 430 in the reservoir 422.

The design of the desiccant cartridge 430 also facilitates the removal of the desiccant cartridge 430 from the reservoir 422 when the desiccant material 436 is spent. In accordance with one preferred method, the desiccant cartridge 430 from the reservoir 422, the eye 452 is engaged by a hook or the like (not shown) and then the desiccant cartridge 430 is pulled as a unit from the reservoir 422. Alternatively, the elongated stand-off portion 442 is gripped to permit the desiccant cartridge 430 to be pulled form the reservoir 422 as a unit.

Those skilled in the art will appreciate that the only extraneous material removed from the receiver 10 with the porous desiccant bag 434 is the rigid stand-off member 432 and the rigid cap 438. It will be apparent that the rigid stand-off member 432 and the rigid cap 438 are relatively simple in design and inexpensive to produce. Thus, it is highly economic to either discard the desiccant cartridge 430 as a unit or to destroy the desiccant cartridge 430 to recover the desiccant material 436 for either regeneration or separate disposal.

Although this invention has been described in conjunction with certain specific forms and modifications thereof, it will be appreciated that a wide variety of other modifications can be made without departing from the spirit and scope of the invention.

What is claimed is:

1. A desiccant cartridge for insertion into a receiver of an integrated condenser/receiver, said desiccant cartridge comprising:
   a porous desiccant bag defining sealed first and second end portions, said second end portion having a flat seal; and
   a rigid member having a web portion and a skirt portion closed at one end by said web portion to form a cavity, and a tab portion extending transversely from said web portion, said flat seal being secured to said tab portion.

2. The desiccant cartridge as recited in claim 1 wherein the skirt portion defines an exterior surface, and said skirt portion has at least one hole extending from said exterior surface to said cavity.

3. The desiccant cartridge as recited in claim 1 wherein:
said rigid member includes a relatively thin, elongated stand-off portion extending from said web portion.

4. The desiccant cartridge as recited in claim 1 wherein:
said rigid member includes a relatively thin, elongated stand-off portion extending from said web portion, said stand-off portion defining a free end spaced from said web portion; and a flange portion positioned along said stand-off portion intermediate said web portion and said free end; and
said web portion and said flange portion are of substantially the same size and shape.

5. The desiccant cartridge as recited in claim 1 wherein:
said rigid member includes a relatively thin, elongated stand-off portion extending from said web portion, said stand-off portion having a boss and an eye through said boss.

6. The desiccant cartridge as recited in claim 1 wherein:
said porous desiccant bag is secured to said tab portion by means selected from the group consisting of ultrasonic welding, thermal welding and vibration welding.

7. The desiccant cartridge as recited in claim 1 wherein said porous desiccant bag contains a fluorescent dye wafer.

8. The desiccant cartridge as recited in claim 1, wherein the integral condenser/receiver includes a rigid end closure, said rigid end closure including a plug portion for closing an open end of said reservoir and an elongated stand-off portion extending from said plug portion for abutment against said web portion of said rigid member to position said desiccant cartridge in said reservoir, said plug portion and said open end of said reservoir present complementary threads for securing said plug portion in said open end.

9. A desiccant cartridge for insertion into a reservoir of an integrated condenser/receiver, said desiccant cartridge comprising:
a porous desiccant bag defining sealed first and second end portions, said second end portion having a flat seal; and
a rigid dongle having a skirt portion defining an exterior surface, a web portion closing said skirt portion to define a cavity and a tab portion extending transversely from said web portion, said flat seal being secured to said tab portion, said skirt portion has at least one hole extending from said exterior surface to said cavity.

10. The desiccant cartridge as recited in claim 9 wherein:
said rigid dongle is an integral plastic casting; and
said porous desiccant bag is secured to said tab portion by ultrasonic welding.

11. A method for charging a desiccant material into a receiver of an integrated receiver/condenser comprising the steps of:
a) casting a rigid plastic member having a web portion and a tab portion extending transversely from said web portion;
b) affixing a flat end seal of a porous desiccant bag to said tab portion to form a desiccant cartridge by means selected from the group consisting of ultrasonic welding, thermal welding and vibration welding; and
c) inserting said desiccant cartridge through an open end of said receiver into a reservoir of said receiver.

12. The method as recited in claim 11 wherein:
said step a) includes casting said rigid plastic member such that said rigid plastic member is an elongated stand-off member extending from the web portion, the stand-off member including a skirt portion closed at one end by said web portion to form a cavity.

13. The method as recited in claim 11 wherein:
said step a) includes casting said rigid plastic member such that said rigid plastic member includes a skirt portion defining an exterior surface, said skirt portion being closed at one end by said web portion to form a cavity; and said skirt portion has at least one hole extending from said exterior surface to said cavity.

14. The method as recited in claim 11 including the additional step of:
d) engaging a rigid end closure in said open end of said receiver, said rigid end closure including a plug portion for closing said open end and an elongated stand-off portion extending from said plug portion for abutment against said web portion of said rigid member to position said desiccant cartridge in said reservoir.

15. The method as recited in claim 11 wherein:
said step a) includes casting said rigid plastic member such that said rigid plastic member includes a relatively thin, elongated stand-off portion extending from said web portion, said stand-off portion defining a free end spaced from said web portion; and a flange portion positioned along said stand-off portion intermediate said web portion and said free end, said web portion and said flange portion are of substantially the same size and shape as a cross-section of said reservoir so as to promote positioning, and inhibit lateral movement, of said desiccant cartridge in said reservoir.

16. The method as recited in claim 11 wherein:
said step a) includes casting said rigid plastic member such that said rigid plastic member includes a relatively thin, elongated stand-off portion extending from said web portion, said stand-off portion having a boss and an eye through said boss.

17. A desiccant cartridge for installation in a receiver of an integrated condenser/receiver, said desiccant cartridge comprising:
a rigid stand-off member having an inner pad portion, an elongated stand-off portion terminating in said inner pad portion, and an outer pad portion spaced from said inner pad portion; and
a porous desiccant bag positioned between said inner and outer pad portions, said porous desiccant bag being affixed to at least one of said inner and outer pad portions.

18. The desiccant cartridge as recited in claim 17 including an eccentric spacing rib portion spacing said inner and outer pads.

19. The desiccant cartridge as recited in claim 18 wherein:
said rigid dongle is an integral plastic casting; and
said porous desiccant bag is secured to said tab portion by means selected from the group consisting of ultrasonic welding, thermal welding and vibration welding.

20. The desiccant cartridge as recited in claim 17 wherein:
said rigid stand-off member includes an eccentric spacing rib portion and a clamp portion supported by said spacing rib portion between said inner pad portion and said outer pad portion; and
said porous desiccant bag being secured by said clamp portion in a position between said inner and outer pad portions.

21. The desiccant cartridge as recited in claim 17 wherein:
said rigid stand-off member includes an eccentric spacing rib portion and a clamp portion supported by said spacing rib portion between said inner pad portion and said outer pad portion;

said clamp portion including a first clamping jaw supported by said spacing rib portion and a second clamping jaw supported by said first clamping jaw through a living hinge;

said first and second clamping jaws defining complementary detents for engagement to secure said clamp in embracing relationship with said porous desiccant bag; and said porous desiccant bag being secured by said clamp portion.

22. The desiccant cartridge as recited in claim 17 wherein:

said rigid stand-off member includes an eccentric spacing rib portion and a clamp portion supported by said spacing rib portion between said inner pad portion and said outer pad portion;

said clamp portion including a first clamping jaw supported by said spacing rib portion and a second clamping jaw supported by said first clamping jaw through a living hinge;

said first and second clamping jaws defining complementary detents for engagement to secure said clamp in embracing relationship with said porous desiccant bag and an outer annular channel for receiving an annular seal; and said porous desiccant bag being secured by said clamp portion.

23. The desiccant cartridge as recited in claim 17 wherein:

said rigid stand-off member includes a cylindrical cage portion spacing said inner and outer portions; and said porous desiccant bag being secured by said cage portion in a position between said inner and outer pad portions.

24. The desiccant cartridge as recited in claim 17 wherein:

said rigid stand-off member includes a cylindrical cage portion spacing said inner and outer portions;

said cage portion comprising a first cage element coupled to said inner and outer pad portions and a second cage element supported by said first cage element through a living hinge;

said first and second cage elements defining complementary detents for engagement to secure said cage portion in embracing relationship with said porous desiccant bag; and said porous desiccant bag being secured by said cage portion in a position between said inner and outer pad portions.

25. The desiccant cartridge as recited in claim 17 wherein:

said rigid stand-off portion includes a flange portion; and said inner pad portion, said outer pad portion and said flange portion are of substantially the same size and shape.

26. The desiccant cartridge as recited in claim 17 wherein said porous desiccant bag contains a fluorescent dye wafer.

27. The desiccant cartridge of claim 26, wherein the inner pad further comprises a tab portion to which the desiccant bag is affixed to.

28. The desiccant cartridge as recited in claim 27, further comprising a rigid cap defining a cavity, a plurality of holes communicating between said cavity and an exterior of said cap, and a spacer portion extending away from said cavity, said second end portion of said porous desiccant bag being received in said cavity.

29. The desiccant cartridge as recited in claim 28, wherein:

said rigid cap includes a sleeve portion and a web portion closing one end of said sleeve portion to define said cavity;

said plurality of holes extends through said web portion; and said spacer portion extends from said web portion.

30. The desiccant cartridge of claim 29, wherein said rigid cap defines a cavity, a plurality of holes communicating between said cavity and an exterior of said rigid cap, and a spacer portion extends toward said end panel, said second end portion of said porous desiccant bag being received in said cavity.

31. The desiccant cartridge of claim 29, wherein maximum effective hole diameters of the plurality of holes are substantially no greater than a maximum effective grain diameters of a desiccant material so as to retain said grains.

32. In an integrated receiver/condenser having a reservoir and a pair of ports communicating with said reservoir, the improvement comprising:

a desiccant cartridge positioned in said reservoir, said desiccant cartridge including a rigid stand-off member and a porous desiccant bag;

said rigid stand-off member having an inner pad portion, an elongated stand-off portion terminating in said inner pad portion, and an outer pad portion spaced from said inner pad portion; and said porous desiccant bag being positioned between said inner and outer pad portions, said porous desiccant bag being affixed to at least one of said inner and outer pad portions.

33. The improvement as recited in claim 32 wherein said rigid stand-off member includes an eccentric spacing rib portion spacing said inner and outer pads.

34. The improvement as recited in claim 32 wherein:

said rigid stand-off member includes an eccentric spacing rib portion and a clamp portion supported by said spacing rib portion between said inner pad portion and said outer pad portion; and said porous desiccant bag being secured by said clamp portion in a position between said inner and outer pad portions.

35. The improvement as recited in claim 32 wherein:

said rigid stand-off member includes an eccentric spacing rib portion and a clamp portion supported by said spacing rib portion between said inner pad portion and said outer pad portion;

said clamp portion including a first clamping jaw supported by said spacer portion and a second clamping jaw supported by said first clamping jaw through a living hinge;

said first and second clamping jaws defining complementary detents for engagement to secure said clamp in embracing relationship with said porous desiccant bag; and said porous desiccant bag being secured by said clamp portion.

36. The improvement as recited in claim 32 wherein:

said rigid stand-off member includes an eccentric spacing rib portion and a clamp portion supported by said spacing rib portion between said inner pad portion and said outer pad portion;

said clamp portion including a first clamping jaw supported by said spacer portion and a second clamping jaw supported by said first clamping jaw through a living hinge;

said first and second clamping jaws defining complementary detents for engagement to secure said clamp in embracing relationship with said porous desiccant bag and an outer annular channel for receiving an annular seal;

said clamp portion being positioned between said pair of ports;
an annular seal positioned in said channel and engaged with an inner surface of said reservoir; and
said porous desiccant bag being secured by said clamp portion.

37. The improvement as recited in claim 32 wherein:
said rigid stand-off member includes a cylindrical cage portion spacing said inner and outer portions; and
said porous desiccant bag being secured by said cage portion in a position between said inner and outer pad portions.

38. The improvement as recited in claim 32 wherein:
said rigid stand-off member includes a cylindrical cage portion spacing said inner and outer portions;
said cage portion comprises a first cage element coupled to said inner and outer pad portions and a second cage element supported by said first cage element through a living hinge;
said first and second cage elements define complementary detents for engagement to secure said cage portion in embracing relationship with said porous desiccant bag; and
said porous desiccant bag is secured by said cage portion in a position between said inner and outer pad portions.

39. The improvement as recited in claim 32 wherein:
said at least one of said inner and outer pad portions is composed of plastic; and
said porous desiccant bag is welded to said at least one of said inner and outer pad portions.

40. The improvement as recited in claim 32 wherein:
said rigid stand-off portion includes a flange portion; and
said inner pad portion, said outer pad portion and said flange portion are each of substantially the same size and shape as said reservoir so as to promote positioning, and inhibit lateral movement, of said desiccant cartridge in said reservoir.

41. The improvement as recited in claim 32 wherein said porous desiccant bag contains a fluorescent dye wafer.

42. A method for making a desiccant cartridge for an integrated receiver/condenser comprising the steps of:
a) casting a rigid plastic stand-off member having an inner pad portion, an elongated stand-off portion terminating in said inner pad portion, and an outer pad portion spaced from said inner pad portion; and
b) affixing a porous desiccant bag to at least one of said inner and outer pad portions.

43. The method as recited in claim 42 wherein:
said step b) includes affixing said porous desiccant bag to said at least one of said inner and outer pad portions by means of a method selected from the group consisting of ultrasonic welding, thermal welding and vibration welding.

44. The method as recited in claim 42 wherein:
said step b) includes affixing said porous desiccant bag to said at least one of said inner and outer pad portions by ultrasonic welding.

45. The method as recited in claim 42 wherein:
said step a) includes casting said rigid plastic stand-off member such that said rigid stand-off member includes an eccentric spacing rib portion and a clamp portion supported by said spacing rib portion between said inner pad portion and said outer pad portion; and
said method includes the additional step of:
c) securing said porous desiccant bag with said clamp portion.

46. The method as recited in claim 42 wherein:
said step a) includes casting said rigid plastic stand-off member such that said rigid stand-off member includes an eccentric spacing rib portion and a clamp portion supported by said spacing rib portion between said inner pad portion and said outer pad portion;
said clamp portion including a first clamping jaw supported by said spacer portion and a second clamping jaw supported by said first clamping jaw through a living hinge;
said first and second clamping jaws defining complementary detents for engagement to secure said porous desiccant bag in said clamp; and
said method includes the additional step of:
c) closing said first and second clamping jaws to engage said complementary detents to secure said desiccant container in said clamp portion.

47. The method as recited in claim 42 wherein:
said step a) includes casting said rigid plastic stand-off member such that said rigid stand-off member includes an eccentric spacing rib portion and a clamp portion supported by said spacing rib portion between said inner pad portion and said outer pad portion;
said clamp portion including a first clamping jaw supported by said spacer portion and a second clamping jaw supported by said first clamping jaw through a living hinge;
said first and second clamping jaws defining complementary detents for engagement to secure said clamp in embracing relationship with said porous desiccant bag and an outer annular channel for receiving an annular seal; and
said method includes the additional steps of:
c) closing said first and second clamping jaws to engage said complementary detents to secure said desiccant container in said clamp portion, and
d) positioning an annular seal in said annular channel.

48. The method as recited in claim 42 wherein:
said step a) includes casting said rigid plastic stand-off member such that said rigid plastic stand-off member has a cylindrical cage portion spacing said inner and outer portions; and
said method includes the additional step of:
c) securing said porous desiccant bag with said cage portion.

49. The method as recited in claim 42 wherein:
said step a) includes casting said rigid plastic stand-off member such that said rigid plastic stand-off member has a cylindrical cage portion spacing said inner and outer portions;
said cage portion comprises a first cage element coupled to said inner and outer pad portions and a second cage element supported by said first cage element through a living hinge;
said first and second cage elements define complementary detents for engagement to secure said cage portion in embracing relationship with said porous desiccant bag; and
said method includes the additional step of:
c) closing said first and second cage elements to engage said complementary detents to secure said desiccant container in said cage portion.

50. The method as recited in claim 42 wherein:
said step a) includes casting said rigid plastic stand-off member such that said rigid plastic stand-off member has a cylindrical cage portion spacing said inner and outer portions;

said cage portion comprises a first cage element coupled to said inner and outer pad portions and a second cage element supported by said first cage element through a living hinge;

said first and second cage elements each comprise a plurality of annularly-arrayed spacer bars extending between said inner and outer pad portions, and a plurality of hoops extending transversely of said plurality of annularly-arrayed spacer bars; and said first and second cage elements define complementary detents for engagement to secure said cage portion in embracing relationship with said porous desiccant bag; and said method includes the additional step of:
c) closing said first and second cage elements to engage said complementary detents to secure said desiccant container in said cage portion.

51. The method of claim 42, wherein the inner pad further comprises a tab portion to which the porous desiccant bag is affixed to by one of ultrasonic welding, thermal welding and vibration welding.

52. The method as recited in claim 51, further comprising the steps of casting a rigid plastic cap defining a cavity, the cap having a plurality of holes communicating between said cavity and an exterior of said cap, and a spacer portion extending away from said cavity, and affixing a first end portion of the porous desiccant bag to the tab portion and a second end portion of said porous desiccant bag in said cavity.

53. The method of claim 52, further comprising includes casting said rigid plastic cap such that said rigid plastic cap includes a sleeve portion and a web portion closing one end of said sleeve portion to define said cavity, said plurality of holes extends through said web portion, and said spacer portion extends from said web portion; and affixing said sleeve portion to said porous desiccant bag by means selected from the group consisting of ultrasonic welding, thermal welding and vibration welding.

54. The method of claim 53, further comprising inserting said desiccant cartridge through an open end of said receiver into a reservoir of said receiver, placing a fluorescent dye wafer in said porous desiccant bag, and inserting a demountable plug with said open end of said receiver.

* * * * *